(12) United States Patent  
Libman et al.

(10) Patent No.: US 9,414,444 B2  
(45) Date of Patent: Aug. 9, 2016

(54) INTERFACE FOR CONTROLLING ENERGY APPLICATION APPARATUS

(75) Inventors: Avner Libman, Holon (IL); Eyal Torres, Savyon (IL); Amichai Ron, Jerusalem (IL); Steven Rogers, D.N. Emek Sorek (IL); Daniella Atzmony, Shoham (IL); Eliezer Gelbart, Holon (IL)

(73) Assignee: GOJI LTD., Hamilton (BM)

( * ) Notice: Subject to any disclaimer, the term of this patent is extended or adjusted under 35 U.S.C. 154(b) by 433 days.

(21) Appl. No.: 13/983,137

(22) PCT Filed: Feb. 11, 2012

(86) PCT No.: PCT/US2012/024779  
§ 371 (c)(1),  
(2), (4) Date: Aug. 1, 2013

(87) PCT Pub. No.: WO2012/109634  
PCT Pub. Date: Aug. 16, 2012

(65) Prior Publication Data  
US 2013/0306627 A1    Nov. 21, 2013

Related U.S. Application Data

(60) Provisional application No. 61/441,908, filed on Feb. 11, 2011.

(51) Int. Cl.  
*H05B 6/64* (2006.01)  
*H05B 6/68* (2006.01)  
*H05B 6/70* (2006.01)

(52) U.S. Cl.  
CPC ............ *H05B 6/6435* (2013.01); *H05B 6/6455* (2013.01); *H05B 6/686* (2013.01); *H05B 6/688* (2013.01); *H05B 6/705* (2013.01); *Y02B 40/143* (2013.01)

(58) Field of Classification Search  
CPC ...... H05B 6/6435; H05B 6/686; H05B 6/705; H05B 6/6455; H05B 6/688; Y02B 40/143  
USPC ................ 219/702, 705, 709, 711; 426/87; 324/632–639; 250/492.1; 422/22, 105, 422/108, 168, 177  
See application file for complete search history.

(56) References Cited

U.S. PATENT DOCUMENTS 3,867,607 A    2/1975    Ohtani  
4,210,795 A    7/1980    Lentz  
(Continued)

FOREIGN PATENT DOCUMENTS

DE    10 2004 014 338 A1    10/2004  
EP    0788296 A1    8/1997  
(Continued)

OTHER PUBLICATIONS

Extended European Search Report in EP 12744629.2, dated Nov. 27, 2014.  
(Continued)

*Primary Examiner* — Quang Van  
(74) *Attorney, Agent, or Firm* — Greenblum & Bernstein, P.L.C.

(57) ABSTRACT

The present disclosure relates to an apparatus for processing objects with RF energy. The apparatus may include a display for displaying to a user an image of an object to be processed, the image including at least a first portion and a second portion of the object. The apparatus may also include an input unit and at least one processor configured to: receive information based on input provided to the input unit; and generate, based on the received information, processing information for use in processing the object to achieve a first processing result in the first portion of the object and a second processing result in the second portion of the object.

11 Claims, 16 Drawing Sheets

(56) References Cited

U.S. PATENT DOCUMENTS

| | | | |
|---|---|---|---|
| 4,714,812 A | 12/1987 | Haagensen et al. | |
| 5,008,506 A | 4/1991 | Asmussen et al. | |
| 5,321,232 A | 6/1994 | Ogle | |
| 5,485,839 A * | 1/1996 | Aida | A61B 17/2256 600/411 |
| 5,958,277 A | 9/1999 | Lee | |
| 6,274,859 B1 | 8/2001 | Yoshino et al. | |
| 6,444,965 B1 | 9/2002 | Ha et al. | |
| 6,469,286 B1 | 10/2002 | Nobue et al. | |
| 2002/0027135 A1 | 3/2002 | Fagrell et al. | |
| 2004/0134904 A1 | 7/2004 | Clemen | |
| 2004/0149736 A1 | 8/2004 | Clothier | |
| 2008/0086050 A1 | 4/2008 | Misic et al. | |
| 2009/0236335 A1 | 9/2009 | Ben-Shmuel et al. | |
| 2010/0115785 A1 | 5/2010 | Ben-Shmuel et al. | |
| 2010/0187224 A1 | 7/2010 | Hyde et al. | |
| 2011/0031237 A1 | 2/2011 | Bilchinsky et al. | |
| 2011/0114633 A1 | 5/2011 | Niklasson et al. | |
| 2011/0154836 A1 | 6/2011 | Ben-Shmuel et al. | |
| 2012/0122072 A1 | 5/2012 | Bilchinsky et al. | |
| 2013/0186887 A1 | 7/2013 | Hallgren et al. | |

FOREIGN PATENT DOCUMENTS

| | | |
|---|---|---|
| GB | 1 239 789 | 7/1971 |
| GB | 1 532 077 | 11/1978 |
| JP | 60-181520 A | 9/1985 |
| WO | 2008/007368 A2 | 1/2008 |
| WO | 2010/052724 A2 | 5/2010 |

OTHER PUBLICATIONS

International Search Report in PCT/US2012/024779, mailing date May 16, 2012.
International Preliminary Examination Report and Written Opinion of the International Searching Authority in PCT/US2012/024779, issued date Aug. 13, 2013.

* cited by examiner

INTERFACE FOR CONTROLLING ENERGY APPLICATION APPARATUS

This application claims priority to U.S. Provisional Patent Application No. 61/441,908 filed on Feb. 11, 2011, the entire contents of which are incorporated herein by reference.

TECHNICAL FIELD

The presently disclosed embodiments relate to a device and method for controlling the application of electromagnetic (EM) energy to an object. In certain embodiments, the control of EM energy application may be based on instructions provided by a user.

BACKGROUND

Electromagnetic waves have been used in various applications to supply energy to objects. In the case of radio frequency (RF) radiation for example, electromagnetic energy may be supplied using a magnetron, which is typically tuned to a single frequency for supplying electromagnetic energy only in that frequency. One example of a commonly used device for supplying electromagnetic energy is a microwave oven. Many microwave ovens supply electromagnetic energy at or about a single frequency of 2.45 GHz.

Microwave oven user interfaces may include a keypad having several keys that indicate several options from which the user can select desired processing instructions, e.g., cooking time and cooking power level. Some keys indicate pre-programmed options such as thawing, warming prepared food, making popcorn, etc. Some user interfaces have display screens that display to the user the various options for cooking or processing the food and allow a user to indicate a desired instruction by touching the screen.

SUMMARY OF A FEW EXEMPLARY ASPECTS OF THE DISCLOSURE

Some exemplary embodiments may include an apparatus for processing objects with RF energy. The apparatus may include a display for displaying to a user an image of an object to be processed, the image including at least a first portion and a second portion of the object. The apparatus may also include an input unit; and at least one processor configured to receive information based on input provided to the input unit and generate, based on the received information, processing information for use in processing the object to achieve a first processing result in the first portion of the object and a second processing result in the second portion of the object. In some embodiments, the image may include more than two portions (e.g., three, four, etc.), and the processor may be configured to further generate processing information to achieve a third, fourth, etc. processing results In some embodiments, the image of the object may be generated based on visible light or infrared radiation received from the object in an energy application zone. The image of the object may also include a graphical image generated based on one or more values indicative of RF energy absorption in the object. The one or more values indicative of RF energy absorption of the object may provide a spatial absorption value. In some embodiments, the image of the object may be based on a temperature profile associated with the object. In some embodiments, the image of the object may include a combination of two or more of: a graphical image generated based on one or more values indicative of RF energy absorption in the object; a temperature profile associated with the object; or an optical image generated based on visible light.

In some embodiments, the processing information may include at least one of a target amount of energy to be dissipated in at least the first portion of the object and/or the second portion of the object; a target temperature profile of at least the first portion of the object and/or the second portion of the object; a desired degree of doneness of at least the first portion of the object and/or the second portion of the object; or a number of cooking units to be applied to at least the first portion of the object and/or the second portion of the object.

In some embodiments, the processing information may include a target temperature profile associating at least the first portion of the object or the second portion of the object with target temperature values. The processing information may also include a duration for which each portion of the object associated with a target temperature value is to be maintained at the target temperature value.

In some embodiments, the information provided to the input unit may include an instruction to adjust a temperature associated with the first portion of the object and to adjust a temperature associated with the second portion of the object such that a target temperature for the first portion of the object and a target temperature for the second portion of the object are achieved simultaneously. The input provided to the input unit may indicate that the first portion of the object is to be processed differently from the second portion of the object.

Some embodiments may include a touch screen configured to allow the user to designate the first portion of the object and the second portion of the object via input provided through the touch screen.

Some embodiments may include an apparatus for processing objects with RF energy, the apparatus comprising a display for displaying to a user an image of at least a first portion and a second portion of an object to be processed and an input unit. The apparatus may also include at least one processor configured to receive information based on input provided to the input unit; and cause, based on the received information, application of RF energy to the object such that a first processing result is achieved in the first portion of the object and a second processing result is achieved in the second portion of the object. The apparatus may also include a source of RF energy. The at least one processor may be configured to generate the image based on electromagnetic feedback providing one or more values indicative of RF energy absorption in the object. The apparatus may further include at least one RF detector configured to provide the electromagnetic feedback. The at least one processor may be configured to generate the image based on temperature readings associated with two or more locations relative to the object. Some embodiments may include one or more thermal sensitive devices configured to provide the temperature readings. The one or more thermal sensitive devices may include an IR camera configured to generate the image of at least the first portion and the second portion of the object to be processed. The one or more thermal sensitive devices may include thermocouples configured to be inserted into or placed on the object. Some embodiments may further comprise an image acquisition device configured to generate the image of at least the first portion and the second portion of the object to be processed.

In some embodiments, the at least one processor may be configured to cause the application of a plurality of electromagnetic field patterns to the object in the energy application zone. The at least one processor may be configured to cause the application of RF energy to the energy application zone at a plurality of MSEs. Further, the at least one processor may be configured to determine a weight associated with one or more electromagnetic field patterns or a weight associated with one or more MSEs. The at least one processor may also be configured to determine a weight associated with one or more MSEs.

In some embodiments, the at least one processor may be configured to correlate between locations associated with the object in the image and locations associated with the object in the energy application zone.

The at least one processor may be configured to cause the application of a plurality of electromagnetic field patterns to the object in the energy application zone; determine an amount of power dissipated in the object for each of the plurality of field patterns; and determine one or more values indicative of energy absorption based on the amount of power dissipated in the object for each of the plurality of field patterns.

The at least one processor may be configured to determine the one or more values indicative of energy absorption across at least a portion of the object and to control the energy application based on the determined one or more values.

In some embodiments, the information provided to the input unit may include an instruction to adjust a temperature associated with the first portion of the object and to adjust a temperature associated with the second portion of the object such that a target temperature for the first portion of the object and a target temperature for the second portion of the object are achieved simultaneously.

Some embodiments may include an apparatus for processing an object in an energy application zone by EM energy, the apparatus comprising at least one processor configured to determine one or more values indicative of EM energy absorption across at least a portion of the object; determine an identity of the object based on the one or more values indicative of energy absorption; and control energy application to the object based on the determined identity of the object and the one or more values indicative of the energy absorption.

The processor may also be configured to determine the identity of the object based on an optical image of at least a portion of the object in the energy application zone. Some embodiments may include at least one image acquiring device configured to acquire an image of the object.

In some embodiments, the one or more values indicative of energy absorption in at least a portion of the object may provide a spatial absorption value.

In some embodiments, the at least one processor may be further configured to cause application of a plurality of electromagnetic field patterns to the object in the energy application zone and for each of the plurality of field patterns, determine an amount of power dissipated in the energy application zone. The processor may also be configured to determine the one or more values indicative of energy absorption based on the amount of power dissipated in the object for each of the plurality of electromagnetic field patterns.

In some embodiments, the at least one processor may be further configured to generate a visual representation of the object based on the one or more values indicative of energy absorption, and cause the visual representation of the object to be shown on a display.

A method of processing an object in an energy application zone using RF energy may include displaying to a user an image showing various portions of the object in the energy application zone; and receiving information relating to processing instructions from the user, wherein the information relating to processing instructions indicates that a first portion of the object shown in the image is to be processed differently from a second portion of the object. The method may further include applying RF energy to the energy application zone based on the information.

The image may comprise at least one of an optical image, generated based on visual light received from the energy application zone; a graphical image, generated based on one or more values indicative of EM energy absorption in the object; or a temperature profile, associating differing portions of the object in the energy application zone with different temperatures. The image may comprise a combination of at least two of a graphical image, generated based on one or more values indicative of EM energy absorption in the object; a temperature profile, associating differing portions of the object in the energy application zone with different temperatures, or an optical image, generated based on visual light received from the energy application zone. The one or more values indicative of energy absorption of the object may provide a spatial absorption value.

In some embodiments, the information relating to processing instructions includes at least one of a target amount of energy to be dissipated in at least a portion of the object, a target temperature profile of at least a portion of the object, a desired degree of doneness of at least a portion of the object, or a number of cooking units to be applied to at least a portion of the object.

The method may further comprise generating the image.

In some embodiments, the method may include correlating between locations associated with the object in the image and locations associated with the object in the energy application zone. The method may include applying RF energy at a plurality of MSEs. The method may include applying a plurality of electromagnetic field patterns to the object in the energy application zone; determining an amount of power dissipated in the object for each of the plurality of field patterns; and determining the one or more values indicative of energy absorption based on the amount of power dissipated in the object for each of the plurality of field patterns.

Some embodiments may include a method of processing an object in an energy application zone by EM energy, the method comprising determining one or more values indicative of EM energy absorption across at least a portion of the object; determining an identity of the object based on the one or more values indicative of energy absorption; and controlling energy application to the object based on the determined identity of the object and the one or more values indicative of the energy absorption. EM energy may include RF energy.

The one or more values indicative of energy absorption in at least a portion of the object may provide a spatial absorption value.

The method may further include causing application of a plurality of electromagnetic field patterns to the object in the energy application zone, for each of the plurality of field patterns, determining an amount of power dissipated in the energy application zone; and determining the one or more values indicative of energy absorption based on the amount of power dissipated in each of the plurality of electromagnetic field patterns. The method may also include determining the identity of an object based on an optical image of at least a portion of the object in an energy application zone.

Some embodiments may include a method of generating processing information for use in processing an object by RF energy. The method may include displaying to a user an image of an object to be processed, the image including at least a first portion and a second portion of the object; receiving input from a user, the input being indicative of a first processing result to be achieved in the first portion and a second processing result to be achieved in the second portion;

and generating, based on the input, processing information for use in processing the object to achieve a first processing result in the first portion of the object and a second processing result in the second portion of the object.

The drawings and detailed description which follow contain numerous alternative examples consistent with the invention. A summary of every feature disclosed is beyond the object of this summary section. For a more detailed description of exemplary aspects of the invention, reference should be made to the drawings, detailed description, and claims, which are incorporated into this summary by reference.

DETAILED DESCRIPTION

Reference will now be made in detail to exemplary embodiments of the invention, examples of which are illustrated in the accompanying drawings. When appropriate, the same reference numbers are used throughout the drawings to refer to the same or like parts.

Some embodiments of the invention relate to an apparatus and method for controlling electromagnetic (EM) energy application to an object in an energy application zone. In some embodiments, controlling the application of EM energy to an object may be based on instructions (e.g., processing instructions) provided by a user via a user interface. In some embodiments, the user interface may be configured to display to the user an image of the object or portion thereof, showing the object in the energy application zone. The user may select, point, or otherwise designate at least a portion of the object to be processed. Through the user interface, the user may provide processing instructions specific to at least one portion of the object. The processing instructions may be provided, for example, by selecting one or more instructions, for example, from a pop-up menu. The EM energy may be applied, wholly or partially, according to the user's instructions. Optionally, the image acquired from the object may be used to automatically identify the object and/or automatically select processing instructions for the object (e.g., without a user intervention).

In one respect, the invention may involve apparatus and methods for applying electromagnetic energy. The term electromagnetic energy, as used herein, includes any or all portions of the electromagnetic spectrum, including but not limited to, radio frequency (RF), infrared (IR), near infrared, visible light, ultraviolet, etc. In one particular example, applied electromagnetic energy may include RF energy with a wavelength in free space of 100 km to 1 mm, which corresponds to a frequency of 3 KHz to 300 GHz, respectively. In some other examples, the applied electromagnetic energy may fall within frequency bands between 500 MHz to 1500 MHz or between 700 MHz to 1200 MHz or between 800 MHz-1 GHz. Microwave and ultra high frequency (UHF) energy, for example, are both within the RF range. Even though examples of the invention are described herein in connection with the application of RF energy, these descriptions are provided to illustrate a few exemplary principles of the invention, and are not intended to limit the invention to any particular portion of the electromagnetic spectrum.

Figure 1:
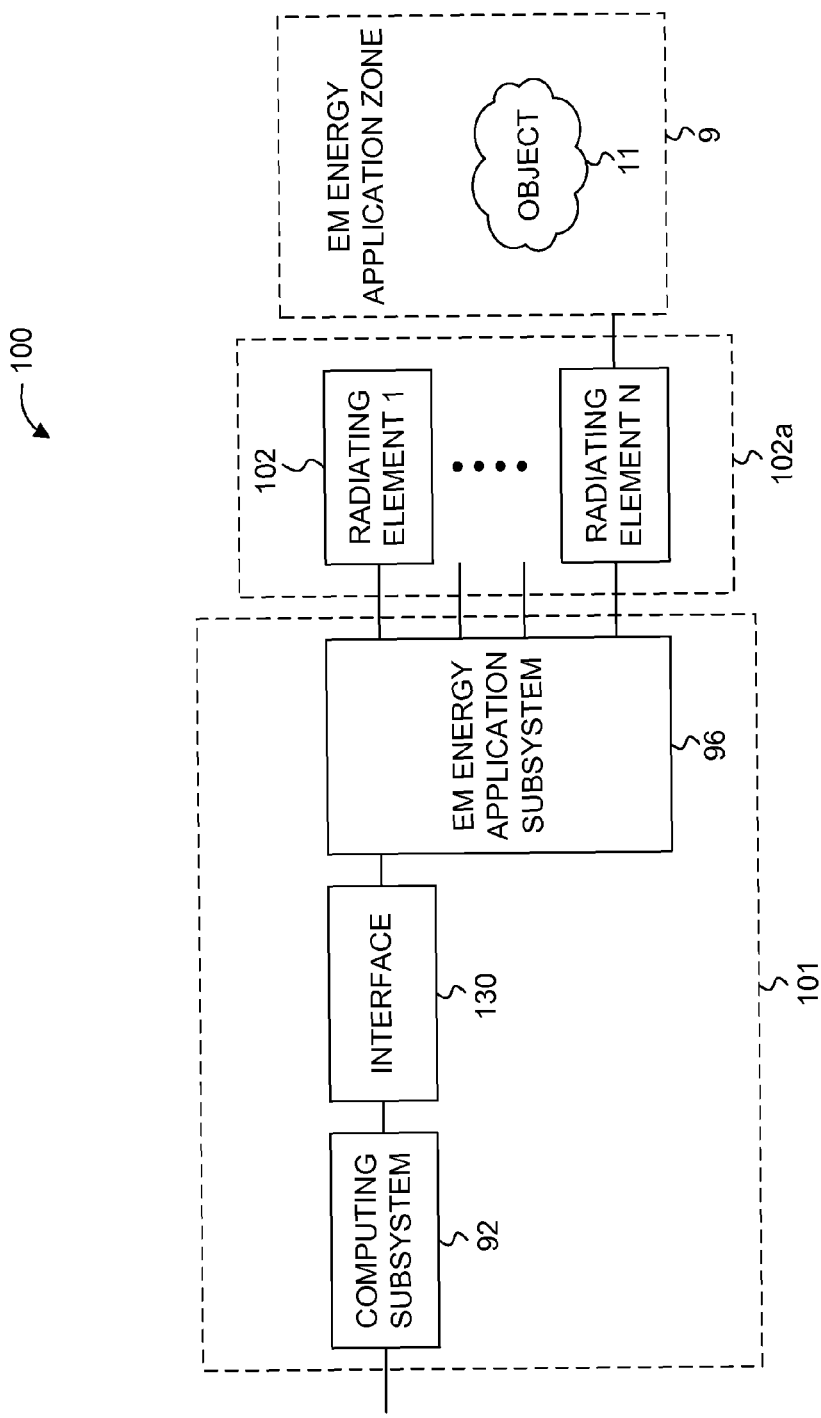
FIG. 1 is a diagrammatic representation of an apparatus for applying electromagnetic energy to an object, in accordance with some exemplary embodiments of the present invention.

In certain embodiments, the application of electromagnetic energy may occur in an energy application zone, such as energy application zone 9, as shown in FIG. 1. Energy application zone 9 may include any void, location, region, or area where electromagnetic energy may be applied. It may be hollow, or may be filled or partially filled with liquids, solids, gases, or combinations thereof. By way of example only, energy application zone 9 may include an interior of an enclosure, interior of a partial enclosure, open space, solid, or partial solid, that allows existence, propagation, and/or resonance of electromagnetic waves. Zone 9 may include a conveyor belt or a rotating plate. For purposes of this disclosure, all such energy application zones may alternatively be referred to as cavities. An object may be considered as in the energy application zone if at least a portion of the object is located in the zone or if some portion of the object receives applied electromagnetic radiation.

In accordance with some embodiments of the invention, an apparatus or method may include the use of at least one source (e.g., source of RF energy) configured to supply electromagnetic energy to the energy application zone. A part, device, or component, etc., configured to perform certain tasks or operations may be equipped with hardware elements and/or software based instructions or logic that enable the part, device, or component to perform a task or operation, under some circumstances, during operation of the part, device, or component. In some embodiments, the part, device, or component, etc., may also perform the tasks in operation. A source may include any component(s) that are suitable for generating and/or supplying electromagnetic energy. Consistent with some embodiments of the invention, electromagnetic energy may be applied to the energy application zone in the form of propagating electromagnetic waves at predetermined wavelengths or frequencies (also known as electromagnetic radiation). Propagating electromagnetic waves may include resonating waves, evanescent waves, and waves that travel through a medium in any other manner. Electromagnetic radiation carries energy that may be imparted to (or dissipated into) matter with which it interacts.

In certain embodiments, electromagnetic energy may be applied to an object 11. An object (or object to be heated or processed) to which electromagnetic energy may be applied is not limited to a particular form. For example, an object may include a liquid, semi-liquid, solid, semi-solid, or gas, depending upon the particular type of process with which the invention is utilized. The object may also include composites or mixtures of matter in differing phases. Objects to which EM energy may be applied may include, e.g., food to be heated, defrosted, or cooked; clothes or other wet material to be dried; frozen organs to be thawed; chemicals to be reacted; fuel or other combustible material to be combusted; hydrated material to be dehydrated; gases to be expanded; liquids to be heated, boiled or vaporized; or any other material for which there is a desire to apply, even nominally, electromagnetic energy. The object may be any desired size. In some embodiments, an object to be processed may have a minimal cross section larger than, e.g., 1, 3, or 5 cm across at least 50% of its volume.

In some embodiments, a portion of electromagnetic energy delivered to energy application zone 9 may be absorbed by object 11. In some embodiments, another portion of the electromagnetic energy delivered or applied to energy application zone 9 may be absorbed by various elements (e.g., food residue, particle residue, additional objects, structures associated with zone 9, or any other electromagnetic energy-absorbing materials found in zone 9) associated with energy application zone 9. Energy application zone 9 may also include loss constituents that do not, themselves, absorb an appreciable amount of electromagnetic energy, but otherwise account for electromagnetic energy losses. Such loss constitutes may include, for example, cracks, seams, joints, doors, or any other loss mechanisms associated with energy application zone 9.

FIG. 1 is a diagrammatic representation of an apparatus 100 for applying electromagnetic energy to an object. Apparatus 100 may include a controller 101, an array 102a of radiating elements 102 (e.g., antennas) including one or more radiating elements, and energy application zone 9. Controller 101 may be electrically coupled to one or more radiating elements 102. As used herein, the term "electrically coupled" refers to one or more either direct or indirect electrical connections. Controller 101 may include a computing subsystem 92, an interface 130, and an electromagnetic energy application subsystem 96. Based on an output of computing subsystem 92, energy application subsystem 96 may respond by generating one or more radio frequency signals to be supplied to radiating elements 102. In turn, the one or more radiating elements 102 may radiate (apply) electromagnetic energy into energy application zone 9. In certain embodiments, this energy can interact with object 11 positioned within energy application zone 9.

Consistent with the presently disclosed embodiments, computing subsystem 92 may include a general purpose or special purpose computer. Computing subsystem 92 may be configured to generate control signals for controlling electromagnetic energy application subsystem 96 via interface 130. Computing subsystem 92 may further receive measured signals from electromagnetic energy application subsystem 96 via interface 130.

While controller 101 is illustrated for exemplary purposes as having three subcomponents, control functions may be consolidated in fewer components, or additional components may be included consistent with the desired function and/or design of a particular embodiment.

Exemplary energy application zone 9 may include locations where energy is applied in an oven (e.g., a cooking oven), chamber, tank, dryer, thawer, dehydrator, reactor, engine, chemical or biological processing apparatus, furnace, incinerator, material shaping or forming apparatus, conveyor, combustion zone, cooler, freezer, etc. In some embodiments, the energy application zone may be part of a vending machine, in which objects are processed once purchased. Thus, consistent with the presently disclosed embodiments, energy application zone 9 may include an electromagnetic resonator 10 (also known as cavity resonator, or cavity) (illustrated for example in FIG. 2A). At times, energy application zone 9 may be congruent with the object or a portion of the object (e.g., the object or a portion thereof, is or may define the energy application zone).

Figure 2A:
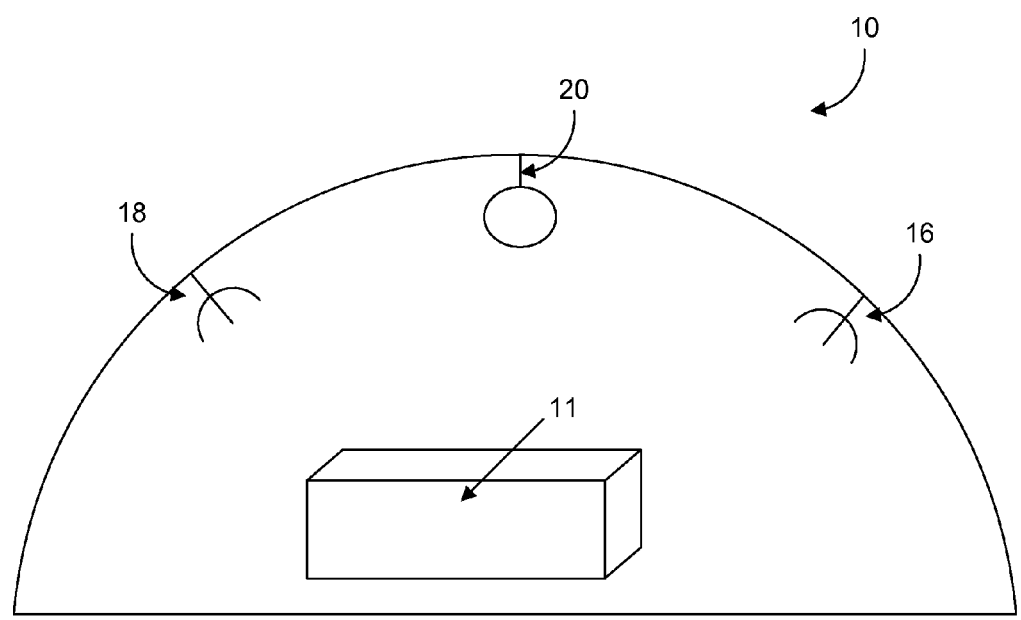
FIG. 2A is a view of a cavity, in accordance with some exemplary embodiments of the present invention.

FIG. 2A shows a sectional view of a cavity 10, which is one exemplary embodiment of energy application zone 9. Cavity 10 may be cylindrical in shape (or any other suitable shape, such as semi-cylindrical, rectangular, elliptical, cuboid, symmetrical, asymmetrical, irregular, regular, among others) and may be made of a conductor, such as aluminum, stainless steel or any suitable metal or other conductive material. In some embodiments, cavity 10 may include walls coated and/or covered with a protective coating, for example, made from materials transparent to EM energy, e.g., metallic oxides or others. In some embodiments, cavity 10 may have a spherical shape or hemispherical shape (for example as illustrated in FIG. 2A). Cavity 10 may be resonant in a predetermined range of frequencies (e.g., within the UHF or microwave range of frequencies, such as between 300 MHz and 3 GHz, or between 400 MHz and 1 GHZ). It is also contemplated that cavity 10 may be closed, e.g., completely enclosed (e.g., by conductor materials), bounded at least partially, or open, e.g., having non-bounded openings. The general methodology of the invention is not limited to any particular cavity shape or configuration, as discussed earlier. FIG. 2A shows a sensor 20 and radiating elements 16 and 18 (examples of radiating elements 102 shown in FIG. 1).

As used herein, the words "sensor" and "detector" refer generally to a device configured to detect information that may be useful in the determination and/or controlling of EM energy application to object 11, for example: one or more aspects of the energy application zone's environment and/or of an object in the zone and/or the EM energy application process. Sensors 20 may include, for example, thermocouples, IR sensors, a weight sensor, pH sensor or humidity sensor.

Figure 2B:
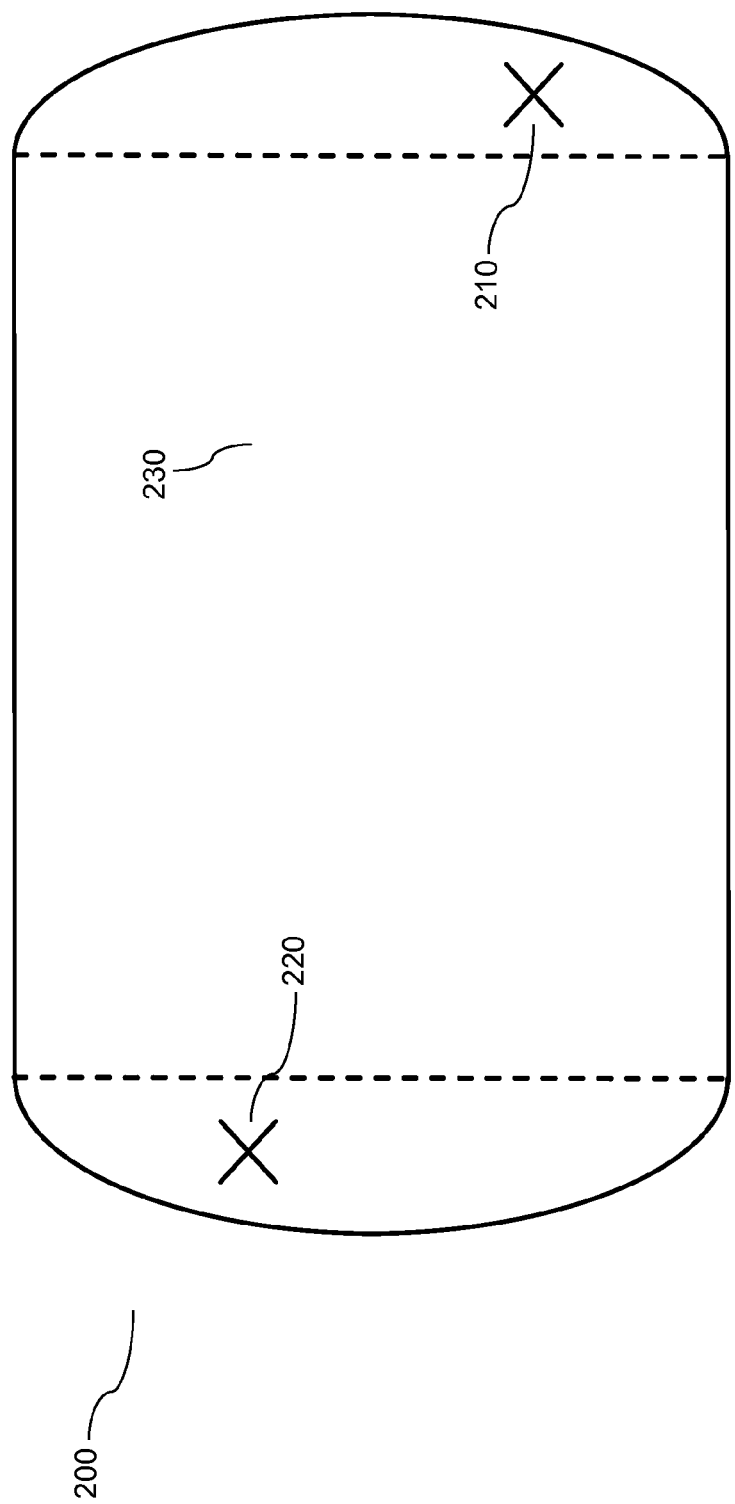
FIG. 2B is a view of a cavity, in accordance with some exemplary embodiments of the present invention.

FIG. 2B shows a top sectional view of a cavity 200 according to another exemplary embodiment of energy application zone 9. FIG. 2B shows radiating elements 210 and 220 (as examples of radiating elements 102 shown in FIG. 1). Cavity 200 comprises a space 230 for receiving object 11 (not shown). Space 230, as shown between the dotted lines in FIG.

2B, has an essentially rectangular cross section, which may be adapted for receiving a tray on top of which object 11 may be placed.

In some embodiments, field adjusting element(s) (not illustrated) may be provided in energy application zone 9, for example, in cavity 10 and/or cavity 200. Field adjusting element(s) may be adjusted to change the electromagnetic wave pattern in the cavity in a way that selectively directs the electromagnetic energy from one or more of radiating elements 16 and 18 (or 210 and 220) into object 11. Additionally or alternatively, field adjusting element(s) may be further adjusted to simultaneously match at least one of the radiating element that act as transmitters, and thus reduce coupling to the other antennas that act as receivers.

Additionally, one or more sensor(s) (or detector(s), e.g., RF detectors) 20 may be used to sense (or detect) information (e.g., signals) relating to object 11 and/or to the energy application process and/or the energy application zone. At times, one or more radiating elements, e.g., radiating elements 16, 18, 210 or 220, may be used as sensors, for example, as RF detectors. The sensors may be used to sense any information, including electromagnetic power, temperature, weight, humidity, motion, etc. The sensed information may be used for any purpose, including process verification, automation, authentication, safety, etc.

Automation may be affected, for example, by adjusting (controlling) heating parameters based on feedback received by the sensor(s). The feedback may be related to one or more aspects of the object. The adjustment of heating parameters may include, for example, stopping or adjusting the processing, e.g., heating, once the sensor(s) indicate that certain stopping or adjusting criteria are met. Such criteria may include, e.g., whether a sufficient amount of energy has been absorbed in the object, once a temperature of one or more portions of the object reaches a predetermined temperature, once time derivatives of absorbed power changes, etc. Such automatic processing adjustment or stoppage may be useful, for instance, in vending machines, where food products are kept cooled or at room temperature and heated or cooked only when purchased. Purchase may initiate processing by heating, and specific heating conditions (for example, energy supplied at one or more modulation space elements (MSEs) (discussed below)) may be determined in accordance with feedback from the heated product. Additionally or alternatively, heating may be stopped once the sensors sense conditions that the controller determines as satisfying stopping criteria. Additionally or alternatively, cooking or processing instructions may be provided on a machine readable element, e.g., barcode or a tag, associated with the processed object, e.g., heated food product, purchased in the vending machine.

In the presently disclosed embodiments, more than one feed and/or a plurality of radiating elements (e.g., antennas) may be provided. The radiating elements may be located on one or more surfaces of, e.g., an enclosure defining the energy application zone. Alternatively, radiating elements may be located inside or outside the energy application zone. One or more of the radiating elements may be near to, in contact with, in the vicinity of or even embedded in object 11 (e.g., when the object is a liquid). The orientation and/or configuration of each radiating element may be distinct or the same, based on the requirements of a particular application, based on a desired target effect, etc. Each radiating element may be positioned, adjusted, and/or oriented to transmit electromagnetic waves along a same direction, or various different directions. Furthermore, the location, orientation, and configuration of each radiating element may be predetermined before applying energy to the object. Alternatively or additionally, the location, orientation, and configuration of each radiating element may be dynamically adjusted, for example, by using a processor, during operation of the apparatus and/or between rounds of energy application. The invention is not limited to radiating elements having particular structures or locations within the apparatus.

Returning to FIG. 1, apparatus 100 may include at least one radiating element 102 for delivery of electromagnetic energy to energy application zone 9. One or more of the radiating element(s) may also be configured to receive electromagnetic energy from energy application zone 9. In other words, an antenna may be configured to function as a transmitter, a receiver, or both. Radiating element, e.g., antennas configured to serve as receivers of electromagnetic energy from an energy application zone may be configured to receive, e.g., electromagnetic waves reflected from the energy application zone.

As used herein, the terms "radiating element" and "antenna" may broadly refer to any structure from which electromagnetic energy may radiate and/or be received, regardless of whether the structure was originally designed for the purposes of radiating or receiving energy, and regardless of whether the structure serves any additional function. For example, a radiating element or an antenna may include an aperture/slot antenna, or an antenna which includes a plurality of terminals transmitting in unison, either at the same time or at a controlled dynamic phase difference (e.g., a phased array antenna). Consistent with some exemplary embodiments, radiating elements 102 may include an electromagnetic energy transmitter (referred to herein as "a transmitting antenna" or "transmitter") that feeds energy into electromagnetic energy application zone 9, an electromagnetic energy receiver (referred herein as "a receiving antenna" or "receiver") that receives energy from zone 9, or a combination of both a transmitter and a receiver. For example, a first antenna may be configured to deliver electromagnetic energy to zone 9, and a second antenna may be configured to receive energy from the first antenna. In some embodiments, one or more antennas may each serve as both receivers and transmitters. In some embodiments, one or more antennas may serve a dual function while one or more other antennas may serve a single function. So, for example, a single antenna may be configured to both deliver electromagnetic energy to the zone 9 and to receive electromagnetic energy via the zone 9; a first antenna may be configured to deliver electromagnetic energy to the zone 9, and a second antenna may be configured to receive electromagnetic energy via the zone 9; or a plurality of antennas could be used, where at least one of the plurality of antennas may be configured to both deliver electromagnetic energy to zone 9 and to receive electromagnetic energy via zone 9. At times, in addition to or as an alternative to delivering and/or receiving energy, an antenna may also be adjusted to affect the field pattern. For example, various properties of the antenna, such as position, location, orientation, temperature, etc., may be adjusted. Different antenna property settings may result in differing electromagnetic field patterns within the energy application zone thereby affecting energy absorption in the object. Therefore, antenna adjustments may constitute one or more variables that can be varied in an energy delivery scheme.

Consistent with the presently disclosed embodiments, energy may be supplied and/or provided to one or more transmitting antennas. Energy supplied to a transmitting antenna may result in energy emitted by the transmitting antenna (referred to herein as "incident energy"). The incident energy may be applied to zone 9, and may be in an amount equal to an amount of energy supplied to the transmitting antenna(s) by a source. A portion of the incident energy may be dissipated in the object or absorbed by the object (referred to herein as "dissipated energy" or "absorbed energy"). Another portion may be reflected back to the transmitting antenna (referred to herein as "reflected energy"). Reflected energy may include, for example, energy reflected back to the transmitting antenna due to mismatch caused by the object and/or the energy application zone, e.g., impedance mismatch. Reflected energy may also include energy retained by the port of the transmitting antenna (e.g., energy that is emitted by the antenna but does not flow into the zone). The rest of the incident energy, other than the reflected energy and dissipated energy, may be coupled to one or more receiving antennas other than the transmitting antenna (referred to herein as "coupled energy."). Therefore, the incident energy ("I") supplied to the transmitting antenna may include all of the dissipated energy ("D"), reflected energy ("R"), and coupled energy ("T"), and may be expressed according to the relationship:

$$I=D+R+\Sigma T_i.$$

In accordance with certain aspects of the invention, the one or more transmitting antennas may deliver electromagnetic energy into zone 9. Energy delivered by a transmitting antenna into the zone (referred to herein as "delivered energy" or (d)) may be the incident energy emitted by the antenna minus the reflected energy at the same antenna. That is, the delivered energy may be the net energy that flows from the transmitting antenna to the zone, i.e., $d=I-R$. Alternatively, the delivered energy may also be represented as the sum of dissipated energy and coupled energy, i.e., $d=D+T$ (where $T=\Sigma Ti$).

In certain embodiments, the application of electromagnetic energy may occur via one or more power feeds. A feed may include one or more waveguides and/or one or more radiating elements (e.g., antennas) for applying electromagnetic energy to the zone. Such antennas may include, for example, patch antennas, fractal antennas, helix antennas, log-periodic antennas, spiral antennas, slot antennas, dipole antennas, loop antennas, slow wave antennas, leaky wave antennas or any other structures capable of transmitting and/or receiving electromagnetic energy.

The invention is not limited to antennas having particular structures or locations. Antennas may be polarized in differing directions in order to, for example, reduce coupling, enhance specific field pattern(s), increase the energy delivery efficiency and support and/or enable a specific algorithm(s). The foregoing are examples only, and polarization may be used for other purposes as well. In one example, three antennas may be placed parallel to orthogonal coordinates; however, it is contemplated that any suitable number of antennas (such as one, two, three, four, five, six, seven, eight, etc.) may be used. For example, a higher number of antennas may add flexibility in system design and improve control of energy distribution, e.g., greater uniformity and/or resolution of energy application in zone 9.

In some embodiments, one or more slow wave antenna(s) may be provided in the energy application zone either in addition to or as an alternative to radiating element(s) 102 (such as antenna(s)). A slow-wave antenna may refer to a wave-guiding structure that possesses a mechanism that permits it to emit power along all or part of its length. The slow wave antenna may comprise a plurality of slots to enable EM energy to be emitted. In some embodiments, the object to be processed, e.g., cooked, may be placed in the energy application zone so that a coupling may be formed between an evanescent EM wave (e.g., emitted from a slow wave antenna) and the object. An evanescent EM wave in free space (e.g., in the vicinity of the slow wave antenna) may be non-evanescent in the object.

Radiating elements, e.g., radiating elements 102, may be configured to feed (apply) energy at specifically chosen modulation space elements, referred to herein as MSEs, which are optionally chosen by controller 101. The term "modulation space" or "MS" is used to collectively refer to all the parameters that may affect a field pattern in the energy application zone and all combinations thereof. In some embodiments, the "MS" may be related to all possible components that may be used in a particular energy application process along with their attributes, operational characteristics, and potential settings of adjustable parameters (absolute and/or relative to others) associated with the components. For example, the "MS" may include a plurality of variable parameters, the number of radiating elements (e.g., antennas), their positioning and/or orientation (if modifiable), the useable bandwidth, a set of all useable frequencies and any combinations or subsets thereof, power settings, phases, etc. The MS may have any number of possible variable parameters, ranging between one parameter only (e.g., a one dimensional MS limited to frequency only or phase only—or other single parameter), two or more dimensions (e.g., varying frequency and amplitude or varying frequency and phase together within the same MS), or many more.

Each variable parameter associated with the MS is referred to as an MS dimension. For example, a three dimensional modulation space having three dimensions designated as frequency (F), phase (P), and amplitude (A). That is, frequency, phase, and amplitude (e.g., an amplitude difference between two or more waves being transmitted at the same time) of the electromagnetic waves may be varied or modulated during energy delivery, while all the other parameters may be pre-determined and fixed during energy delivery. The modulation space may be described in terms of three dimensions for ease of discussion only. The MS may have any number of dimensions, e.g., one dimension, two dimensions, four dimensions, n dimensions, etc. In one example, a one dimensional modulation space oven may provide MSEs that differ one from the other only by frequency.

The term "modulation space element" or "MSE," may refer to a specific set of values of the variable parameters in MS. Therefore, the MS may also be considered to be a collection of all possible MSEs. For example, two MSEs may differ one from another in the relative amplitudes of the energy being supplied to a plurality of radiating elements. For example, an MSE in three-dimensional MS has a specific frequency F(i), a specific phase P(i), and a specific amplitude A(i). If even one of these MSE variables changes, then the new set defines another MSE. For example, (3 GHz, 30°, 12 V) and (3 GHz, 60°, 12 V) are two different MSEs, although only the phase component is different.

Differing combinations of these MS parameters will lead to differing field patterns across the energy application zone and differing energy distribution patterns in the object. A plurality of MSEs that can be executed sequentially or simultaneously to excite a particular field pattern in the energy application zone may be collectively referred to as an "energy delivery scheme." For example, an energy delivery scheme may consist of three MSEs: (F(1), P(1), A(1)); (F(2), P(2), A(2)) (F(3), P(3), A(3)). Such an energy delivery scheme may result in applying the first, second, and third MSE to the energy application zone.

The invention, in its broadest sense, is not limited to any particular number of MSEs or MSE combinations. Various MSE combinations may be used depending on the requirements of a particular application and/or on a desired energy transfer profile, and/or given equipment, e.g., cavity dimensions. The number of options that may be employed could be as few as two or as many as the designer desires, depending on factors such as intended use, level of desired control, hardware or software resolution and cost.

In certain embodiments, there may be provided at least one processor. As used herein, the term "processor" may include an electric circuit that performs a logic operation on input or inputs. For example, such a processor may include one or more integrated circuits, microchips, microcontrollers, microprocessors, all or part of a central processing unit (CPU), graphics processing unit (GPU), digital signal processors (DSP), field-programmable gate array (FPGA) or other circuit suitable for executing instructions or performing logic operations. The at least one processor may be coincident with or may constitute any part of controller 101.

The instructions executed by the processor may, for example, be pre-loaded into the processor or may be stored in a separate memory unit such as a RAM, a ROM, a hard disk, an optical disk, a magnetic medium, a flash memory, other permanent, fixed, or volatile memory, or any other mechanism capable of storing instructions for the processor. The processor(s) may be customized for a particular use, or can be configured for general-purpose use and can perform different functions by executing different software.

If more than one processor is employed, all may be of similar construction, or they may be of differing constructions electrically connected or disconnected from each other. They may be separate circuits or integrated in a single circuit. When more than one processor is used, they may be configured to operate independently or collaboratively. They may be coupled electrically, magnetically, optically, acoustically, mechanically or by other means permitting them to interact.

The at least one processor may be configured to cause electromagnetic energy to be applied to zone 9 via one or more radiating elements, for example across a series of MSEs, in order to apply electromagnetic energy at each such MSE to object 11. For example, the at least one processor may be configured to regulate one or more components of controller 101 in order to cause the energy to be applied.

In certain embodiments, the at least one processor may be configured to determine a value indicative of energy absorbable by the object at each of a plurality of MSEs. This may occur, for example, using one or more lookup tables, by pre-programming the processor or memory associated with the processor, and/or by testing an object in an energy application zone to determine its absorbable energy characteristics. One exemplary way to conduct such a test is through a sweep.

As used herein, a sweep may include, for example, the transmission over time of energy at more than one MSE. For example, a sweep may include the sequential transmission of energy at multiple MSEs in one or more contiguous MSE bands; the sequential transmission of energy at multiple MSEs in more than one non-contiguous MSE band; the sequential transmission of energy at individual non-contiguous MSEs; and/or the transmission of synthesized pulses having a desired MSE/power spectral content (e.g., a synthesized pulse in time). The MSE bands may be contiguous or non-contiguous. Thus, during an MSE sweeping process, the at least one processor may regulate the energy supplied to the at least one radiating elements to sequentially apply electromagnetic energy at various MSEs to zone 9, and to receive feedback which serves as an indicator of the energy absorbable by object 11. While the invention is not limited to any particular measure of feedback indicative of energy absorption in the object, various exemplary indicative values are discussed below.

During the sweeping process, electromagnetic energy application subsystem 96 may be regulated to receive electromagnetic energy reflected and/or coupled at radiating element(s) 102, and to communicate the measured energy information (e.g., information pertaining to and/or related to and/or associated with the measured energy) back to computing subsystem 92 via interface 130, as illustrated in FIG. 1. Computing subsystem 92 may then be regulated to determine a value indicative of energy absorbable by object 11 at each of a plurality of MSEs based on the received information. Consistent with some of the presently disclosed embodiments, a value indicative of the absorbable energy may include a dissipation ratio (referred to herein as "DR") associated with each of a plurality of MSEs. As referred to herein, a "dissipation ratio" (or "absorption efficiency" or "power efficiency"), may be defined as a ratio between electromagnetic energy absorbed by object 11 and electromagnetic energy supplied to the radiating element. In these embodiments, DR=D/I. In some embodiments, the dissipation ratio may be a ratio between electromagnetic energy absorbed by object 11 and electromagnetic energy delivered to energy application zone 9. In these embodiments, DR=D/d.

Energy that may be dissipated or absorbed by an object is referred to herein as "absorbable energy" or "absorbed energy". Absorbable energy may be an indicator of the object's capacity to absorb energy or the ability of the apparatus to cause energy to dissipate in a given object (for example—an indication of the upper limit thereof). In some of the presently disclosed embodiments, absorbable energy may be calculated as a product of the incident energy (e.g., maximum incident energy) supplied to the at least one radiating element and the dissipation ratio. Reflected energy (e.g., the energy not absorbed or transmitted) may, for example, be a value indicative of energy absorbed by the object. By way of another example, a processor might calculate or estimate absorbable energy based on the portion of the incident energy that is reflected and the portion that is coupled. That estimate or calculation may serve as a value indicative of absorbed and/or absorbable energy.

During an MSE sweep, for example, the at least one processor may be configured to control a source of electromagnetic (RF) energy such that energy is sequentially applied to an object at a series of MSEs. The at least one processor might then receive a signal indicative of energy reflected at each MSE and, optionally, also a signal indicative of the energy coupled to other radiating elements at each MSE. Using a known amount of incident energy supplied to the radiating elements and a known amount of energy reflected and/or coupled (e.g., thereby indicating an amount of energy absorbed at each MSE), an absorbable energy indicator may be calculated or estimated. Alternatively, the processor might simply rely on an indicator of reflection and/or coupling as a value indicative of absorbable energy.

Absorbable energy may also include energy that may be dissipated by the structures of the energy application zone in which the object is located (e.g., cavity walls) or leakage of energy at an interface between an oven cavity and an oven door. Because absorption in metallic or conducting material (e.g., the cavity walls or elements within the cavity) is characterized by a large quality factor (also known as a "Q factor"), MSEs having a large Q factor may be identified as being associated with conducting material, and at times, a choice may be made not to transmit energy in such MSEs. In that case, the amount of electromagnetic energy absorbed in the cavity walls may be substantially small, and thus, the amount of electromagnetic energy absorbed in the object may be substantially equal to the amount of absorbable energy.

In some of the presently disclosed embodiments, a dissipation ratio may be calculated using formula (I):

$$(1) DR = (Pin - Prf - Pcp)/Pin \qquad (1)$$

where Pin represents the electromagnetic energy and/or power supplied into zone 9 by radiating elements 102, Prf represents the electromagnetic energy reflected/returned at those antennas that function as transmitters, and Pcp represents the electromagnetic energy coupled at those antennas that function as receivers. DR may be a value between 0 and 1, and thus may be represented by a percentage number.

Alternative indicators of absorbable energy may be used, depending for example on the structure employed and the application.

In certain embodiments, the at least one processor may also be configured to cause energy to be supplied to the at least one radiating element in at least a subset of a plurality of MSEs. Energy transmitted (applied) to the zone at each of the subset of MSEs may be a function of the absorbable energy value at the corresponding MSE. For example, energy transmitted to the zone at MSE(i) may be a function of the absorbable energy value at MSE(i). The energy supplied to at least one radiating element 102 at each of the subset of MSEs may be determined as a function of the absorbable energy value at each MSE (e.g., as a function of a dissipation ratio, maximum incident energy, a combination of the dissipation ratio and the maximum incident energy, or some other indicator). In some embodiments, the subset of the plurality of MSEs and/or the energy transmitted to the zone at each of the subset of MSEs may be determined based on or in accordance with a result of absorbable energy information (e.g., absorbable energy feedback) obtained during an MSE sweep (e.g., at the plurality of MSEs). That is, using the absorbable energy information, the at least one processor may adjust energy supplied to the radiating element(s) at each MSE such that the energy at a particular MSE may in some way be a function of an indicator of absorbable energy at that MSE. The functional correlation may vary depending upon application and/or a desired target effect, e.g., a more uniform energy distribution profile may be desired across object 11. The invention is not limited to any particular scheme, but rather may encompass any technique for controlling the energy supplied by taking into account an indication of absorbable energy.

In certain embodiments, the at least one processor may be configured to cause energy to be supplied to the at least one radiating element in at least a subset of the plurality of MSEs, wherein energy transmitted to the zone at each of the subset of MSEs is inversely related to the absorbable energy value at the corresponding MSE. Such an inverse relationship may involve a general trend—e.g., when an indicator of absorbable energy in a particular MSE subset (i.e., one or more MSEs) tends to be relatively high, the actual incident energy at that MSE subset may be relatively low. When an indicator of absorbable energy in a particular MSE subset tends to be relatively low, the incident energy may be relatively high. This substantially inverse relationship may be even more closely correlated. For example, the transmitted energy may be set such that its product with the absorbable energy value (i.e., the absorbable energy by object 11) is substantially constant across the MSEs applied.

Some exemplary energy delivery schemes may lead to more spatially uniform energy absorption in the object. As used herein, "spatial uniformity" may refer to a condition where the absorbed energy across the object or a portion (e.g., a selected portion) of the object that is targeted for energy application is substantially constant (for example per volume unit or per mass unit). In some embodiments, the energy absorption is considered "substantially constant" if the variation of the dissipated energy at different locations of the object is lower than a threshold value. For instance, a deviation may be calculated based on the distribution of the dissipated energy in the object, and the absorbable energy is considered "substantially constant" if the deviation between the dissipation values of different parts of the object is less than 50%. Because in many cases spatially uniform energy absorption may result in spatially uniform temperature increase, consistent with the presently disclosed embodiments, "spatial uniformity" may also refer to a condition where the temperature increase across the object or a portion of the object that is targeted for energy application is substantially constant. The temperature increase may be measured by a sensing device, for example a temperature sensor provided in zone 9. In some embodiments, spatial uniformity may be defined as a condition, where a given property of the object is uniform or substantially uniform after processing, e.g., after a heating process. Examples of such properties may include temperature, readiness degree (e.g., of food cooked in the oven), mean particle size (e.g., in a sintering process), etc.

In order to achieve control over the spatial pattern of energy absorption in an object or a portion of an object, controller 101 may be configured to hold substantially constant the amount of time at which energy is supplied to radiating elements 102 at each MSE, while varying the amount of power supplied to the radiating element(s) at each MSE as a function of the absorbable energy value. In some embodiments, controller 101 may be configured to cause the energy to be supplied to the radiating element(s) at a particular MSE or MSEs at a power level substantially equal to a maximum power level of the device and/or the amplifier at the respective MSE(s).

Alternatively or additionally, controller 101 may be configured to vary the period of time during which energy is applied at each MSE as a function of the absorbable energy value. At times, both the duration and power at which each MSE is applied are varied as a function of the absorbable energy value. Varying the power and/or duration of energy supplied to radiating element(s) at each MSE may be used to cause substantially uniform energy absorption in the object or to have a controlled spatial pattern of energy absorption, for example, based on feedback from the dissipation properties of the object at each transmitted MSE.

Consistent with some other embodiments, controller 101 may be configured to cause the amplifier to supply no energy at all at particular MSE(s). Similarly, if the absorbable energy value exceeds a predetermined threshold, controller 101 may be configured to cause the radiating element to apply energy at a power level less than a maximum power level of the amplifier.

Because absorbable energy can change based on a host of factors including object temperature, in some embodiments, it may be beneficial to regularly update absorbable energy values and adjust energy application based on the updated absorption values. These updates can occur multiple times a second, or can occur every few seconds or longer, depending on the requirements of a particular application.

In accordance with an aspect of some embodiments of the invention, the at least one processor (e.g., controller 101 or processor 2030) may be configured to determine a desired and/or target energy absorption level at each of a plurality of MSEs and adjust energy supplied to the antenna at each MSE in order to obtain the target energy absorption level at each MSE. For example, controller 101 may be configured to target a desired energy absorption level at each MSE in order to achieve or approximate substantially uniform energy absorption across a range of MSEs.

Alternatively, controller 101 may be configured to provide a target energy absorption level at each of a plurality of object portions, which collectively may be referred to as an energy absorption profile across the object. An absorption profile may include uniform energy absorption in the object, non-uniform energy absorption in the object, differing energy absorption values in differing portions of the object, substantially uniform absorption in one or more portions of the object, or any other desirable pattern of energy absorption in an object or portion(s) of an object.

In some embodiments, the at least one processor may be configured to adjust energy supplied to the antenna at each MSE in order to obtain a desired target energy effect and/or energy effect in the object, for example: a different amount of energy may be provided to different parts and/or regions of the object.

In some embodiments, a resolution of the different regions (for example, to which different amounts of energy are applied) and/or a resolution of a discretization of the zone (e.g., the zone may be divided into a plurality of regions) may be a fraction of the wavelength of the applied EM energy, e.g., on the order of $\lambda/10$, $\lambda/5$, $\lambda/2$. For example, for 900 MHz, the corresponding wavelength ($\lambda$) in air ($\in=1$) is 33.3 cm and the resolution may be on the order of 3 cm, e.g., (3 cm)$^3$ resolution. In water, for example, the wavelength is approximately 9 times shorter at the same frequency (900 MHz), thus the resolution may be in the order of 0.33 cm, e.g., (0.33 cm)$^3$. In meat, for example, the wavelength corresponding to frequency of 900 MHz is about 7 times shorter than in air and the resolution may be in the order of 0.4 cm, e.g., (0.4 cm)$^3$.

Figure 3:
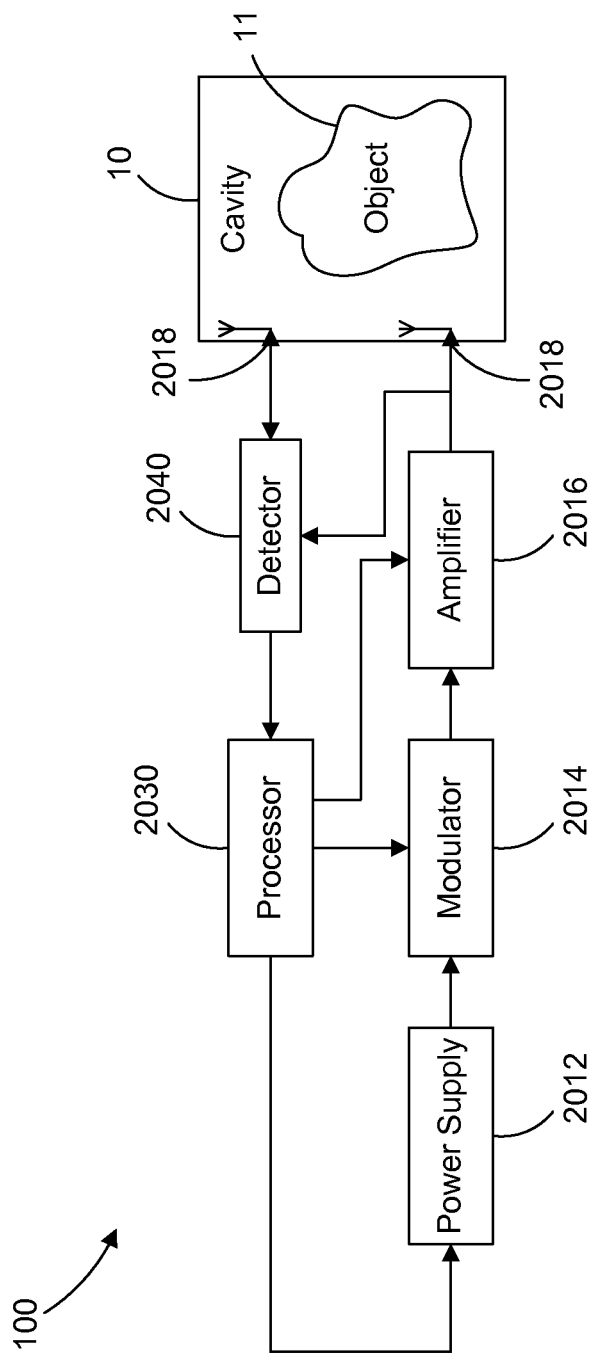
FIG. 3 is a diagrammatic representation of an apparatus for applying electromagnetic energy to an object, in accordance with some exemplary embodiments of the present invention.

Reference in now made to FIG. 3, which provides a diagrammatic representation of an exemplary apparatus 100 for applying electromagnetic energy to an object, in accordance with some embodiments of the present invention. In accordance with some embodiments, apparatus 100 may include a processor 2030 which may regulate modulations performed by modulator 2014. In some embodiments, modulator 2014 may include at least one of a phase modulator, a frequency modulator, and an amplitude modulator configured to modify the phase, frequency, and amplitude of the AC waveform, respectively. Processor 2030 may alternatively or additionally regulate at least one of location, orientation, and configuration of each radiating element 2018, for example, using an electro-mechanical device. Such an electro-mechanical device may include a motor or other movable structure for rotating, pivoting, shifting, sliding or otherwise changing the orientation and/or location of one or more of radiating elements 2018. Alternatively or additionally, processor 2030 may be configured to regulate one or more field adjusting elements located in the energy application zone, in order to change the field pattern in the zone.

In some embodiments, apparatus 100 may involve the use of at least one source configured to supply electromagnetic energy to radiating elements 2018. By way of example, and as illustrated in FIG. 3, the source may include one or more of a power supply 2012 configured to generate electromagnetic waves that carry electromagnetic energy. For example, power supply 2012 may include a magnetron configured to generate high power microwave waves at a predetermined wavelength or frequency. Alternatively, power supply 2012 may include a semiconductor oscillator, such as a voltage controlled oscillator, configured to generate AC waveforms (e.g., AC voltage or current) with a constant or varying frequency. AC waveforms may include sinusoidal waves, square waves, pulsed waves, triangular waves, or another type of waveforms with alternating polarities. Alternatively, a source of electromagnetic energy may include any other power supply, such as electromagnetic field generator, electromagnetic flux generator, solid state amplifiers or any mechanism for generating vibrating electrons.

In some embodiments, apparatus 100 may include a phase modulator (not illustrated) that may be controlled to perform a predetermined sequence of time delays on an AC waveform, such that the phase of the AC waveform is increased by a number of degrees (e.g., 10 degrees) for each of a series of time periods. In some embodiments, processor 2030 may dynamically and/or adaptively regulate modulation based on feedback from the energy application zone. For example, processor 2030 may be configured to receive an analog or digital feedback signal from detector 2040, which may be an RF detector, indicating an amount of electromagnetic energy received from cavity 10, and processor 2030 may dynamically determine a time delay at the phase modulator for the next time period based on the received feedback signal or another feedback, such as DR.

In some embodiments, apparatus 100 may include a frequency modulator (not illustrated). The frequency modulator may include a semiconductor oscillator configured to generate an AC waveform oscillating at a predetermined frequency. The predetermined frequency may be in association with an input voltage, current, and/or other signal (e.g., analog or digital signals). For example, a voltage controlled oscillator may be configured to generate waveforms at frequencies proportional to the input voltage.

Processor 2030 may be configured to regulate an oscillator (not illustrated) to sequentially generate AC waveforms oscillating at various frequencies within one or more predetermined frequency bands. In some embodiments, a predetermined frequency band may include a working frequency band, and the processor may be configured to cause the transmission of energy at frequencies within a sub-portion of the working frequency band. A working frequency band may be a collection of frequencies selected because, in the aggregate, they achieve a desired goal, and there is diminished need to use other frequencies in the band if that sub-portion achieves the goal. Once a working frequency band (or subset or sub-portion thereof) is identified, the processor may sequentially apply power at each frequency in the working frequency band (or subset or sub-portion thereof). This sequential process may be referred to as "frequency sweeping." In some embodiments, each frequency may be associated with a feeding scheme (e.g., a particular selection of MSEs). In some embodiments, based on the feedback signal provided by detector 2040, processor 2030 may be configured to select one or more frequencies from a frequency band, and regulate an oscillator to sequentially generate AC waveforms at these selected frequencies.

Alternatively or additionally, processor 2030 may be further configured to regulate amplifier 2016 to adjust amounts of energy supplied to radiating elements 2018, based on the feedback signal. Consistent with some embodiments, detector 2040 may detect an amount of energy reflected from the energy application zone and/or energy coupled at a particular frequency, and processor 2030 may be configured to cause the amount of energy applied at that frequency to be low when the reflected energy and/or coupled energy is low. Additionally or alternatively, processor 2030 may be configured to cause one or more radiating elements to deliver energy at a particular frequency over a short duration when the reflected energy is low at that frequency.

In some embodiments, the apparatus may include more than one EM energy generating component. For example, more than one oscillator may be used for generating AC waveforms of differing frequencies. The separately generated AC waveforms may be amplified by one or more amplifiers. Accordingly, at any given time, radiating elements 2018 may be caused to simultaneously transmit electromagnetic waves at, for example, two differing frequencies to cavity 10.

Processor 2030 may be configured to regulate the phase modulator in order to alter a phase difference between two electromagnetic waves delivered to the energy application zone. In some embodiments, the source of electromagnetic energy may be configured to supply electromagnetic energy in a plurality of phases, and the processor may be configured to cause the transmission of energy at a subset of the plurality of phases. By way of example, the phase modulator may include a phase shifter. The phase shifter may be configured to cause a time delay in the AC waveform in a controllable manner within cavity 10, delaying the phase of an AC waveform anywhere from between 0-360 degrees.

In some embodiments, a splitter (not illustrated) may be provided in apparatus 100 to split an AC signal, for example generated by an oscillator, into two AC signals (e.g., split signals). Processor 2030 may be configured to regulate the phase shifter to sequentially cause various time delays such that the phase difference between two split signals may vary over time. This sequential process may be referred to as "phase sweeping." Similar to the frequency sweeping described above, phase sweeping may involve a working subset of phases selected to achieve a desired energy application goal.

The processor may be configured to regulate an amplitude modulator in order to alter an amplitude of at least one electromagnetic wave supplied to the radiating elements. In some embodiments, the source of electromagnetic energy may be configured to supply electromagnetic energy in a plurality of amplitudes, and the processor may be configured to cause the transmission of energy at a subset of the plurality of amplitudes. In some embodiments, the apparatus may be configured to apply (deliver) electromagnetic energy through a plurality of radiating elements, and the processor may be configured to supply energy with differing amplitudes simultaneously to at least two radiating elements.

Although FIG. 3 and FIGS. 2A and 2B illustrate circuits including two radiating elements (e.g., elements 16, 18; 210, 220; or 2018), it should be noted that any number of radiating elements may be employed, and the circuit may select combinations of MSEs through selective use of radiating elements. By way of example only, in an apparatus having three radiating elements A, B, and C, amplitude modulation may be performed with radiating elements A and B, phase modulation may be performed with radiating elements B and C, and frequency modulation may be performed with radiating elements A and C. In some embodiments amplitude may be held constant and field changes may be caused by switching between radiating elements and/or subsets of radiating elements. Further, radiating elements may include a device that causes their location or orientation to change, thereby causing field pattern changes. The combinations are virtually limitless, and the invention is not limited to any particular combination, but rather reflects the notion that field patterns may be altered by altering one or more MSEs.

Some or all of the forgoing functions and control schemes, as well as additional functions and control schemes, may be carried out, by way of example, using structures such as the electromagnetic energy application subsystems schematically depicted in FIG. 1 or FIG. 3. Within the scope of the invention, alternative structures might be used for accomplishing the functions described herein, as would be understood by a person of ordinary skill in the art, reading this disclosure.

Figure 4:
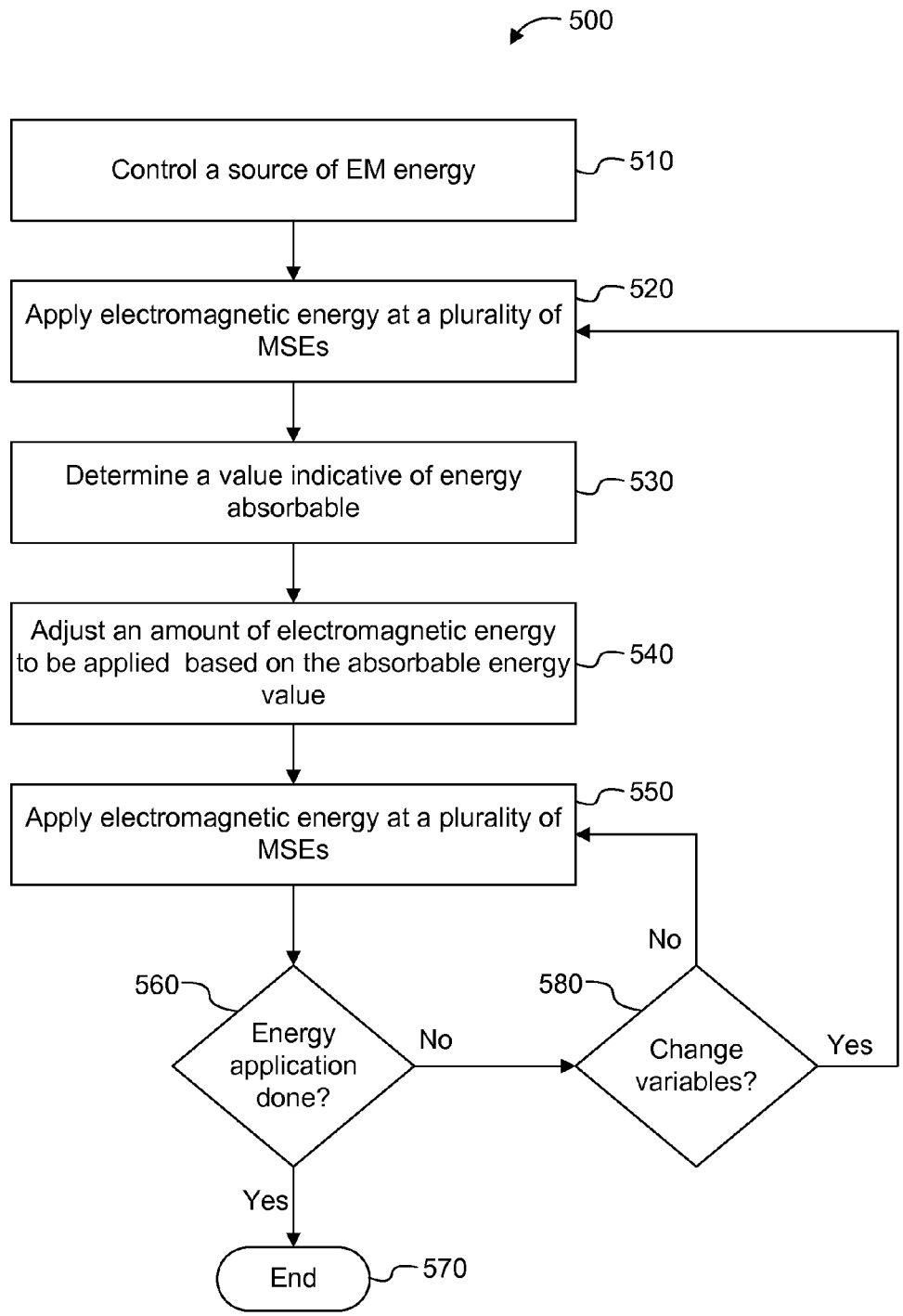
FIG. 4 is a flow chart of a method for applying electromagnetic energy to an energy application zone in accordance with some embodiments of the present invention.

FIG. 4 represents a method for applying electromagnetic energy to an object in accordance with some embodiments of the present invention. Electromagnetic energy may be applied to an object, for example, through at least one processor implementing a series of steps of method 500 of FIG. 4.

In certain embodiments, method 500 may involve controlling a source of electromagnetic energy (step 510). A "source" of electromagnetic energy may include any components that are suitable for generating electromagnetic energy. By way of example only, in step 510, the at least one processor may be configured to control electromagnetic energy application subsystem 96 or power supply 2012.

The source may be controlled to supply electromagnetic energy at a plurality of MSEs (e.g., at a plurality of frequencies and/or phases and/or amplitude etc.) to at least one radiating element, as indicated in step 520. Various examples of MSE supply, including sweeping, as discussed earlier, may be implemented in step 520. Alternatively or additionally, other schemes for controlling the source may be implemented so long as that scheme results in the supply of energy at a plurality of MSEs. The at least one processor may regulate subsystem 96 to supply energy at multiple MSEs to at least one transmitting radiating element. Additionally or alternatively, other schemes for controlling the source may be implemented. For example, one or more processing instructions and/or other information may be obtained from a machine readable element (e.g., barcode or RFID tag). The machine readable element may be read by a machine reader (e.g., a barcode reader, an RFID reader) and may be provided to the processor and/or the controller by an interface. In some embodiments, a user may provide one or more processing instructions and/or may provide other information relating to the object (e.g., an object type and/or weight) through an interface, e.g., a GUI interface, a touch screen etc.

In certain embodiments, the method may further involve determining a value indicative of energy absorbable by the object at each of the plurality of MSEs, in step 530. An absorbable energy value may include any indicator—whether calculated, measured, derived, estimated or predetermined—of an object's capacity to absorb energy. For example, computing subsystem 92 may be configured to determine an absorbable energy value, such as a dissipation ratio associated with each MSE.

In certain embodiments, the method may also involve adjusting an amount of electromagnetic energy to be applied at each of the plurality of MSEs based on the absorbable energy value at each MSE (step 540). For example, in step 540, at least one processor may determine an amount of energy to be applied at each MSE, as a function of the absorbable energy value associated with that MSE.

In some embodiments, a choice may be made not to use all possible MSEs. For example, a choice may be made not to use all possible frequencies in a working band, such that the emitted frequencies are limited to a sub band of frequencies, for example, where the Q factor in that sub band is smaller or higher than a threshold. Such a sub band may be, for example 50 MHz wide 100 MHz wide, 150 MHz wide, or even 200 MHz wide or more.

In some embodiments, the at least one processor may determine a weight, e.g., power level, used for supplying the determined amount of energy at each MSE, as a function of the absorbable energy value. For example, an amplification ratio of amplifier 2016 may be changed inversely with the energy absorption characteristic of object 11 at each MSE. In some embodiments, when the amplification ratio is changed inversely with the energy absorption characteristic, energy may be supplied for a constant amount of time at each MSE. Alternatively or additionally, the at least one processor may determine varying durations at which the energy is supplied at each MSE. For example, the duration and power may vary from one MSE to another, such that their product inversely correlates with the absorption characteristics of the object. In some embodiments, the at least one processor and/or controller (e.g., controller 101) may determine both the power level and time duration for supplying to the radiating elements the energy at each MSE.

In certain embodiments, the method may also involve applying electromagnetic energy at a plurality of MSEs (step 550) to the energy application zone. Respective weights are optionally assigned to each of the MSEs to be transmitted (step 540) for example based on the absorbable energy value (as discussed above). Electromagnetic energy may be supplied to cavity 10 via radiating elements, e.g., elements 102, 16, 18 or 2018. In some embodiments, MSEs may be swept sequentially, e.g., across a range of cavity's resonance MSEs or, along a portion of the range.

Energy application may be interrupted periodically (e.g., several times a second) for a short time (e.g., only a few milliseconds or tens of milliseconds). Once energy application is interrupted, in step 560, it may be determined if the energy application should be terminated. Energy application termination criteria may vary depending on application. For example, for a heating application, termination criteria may be based on time, temperature, total energy absorbed, or any other indicator that the process at issue is compete. For example, heating may be terminated when the temperature of object 11 rises to a predetermined temperature threshold. If in step 560, it is determined that energy application should be terminated (step 560: yes), energy application may end in step 570. In another example, in thawing application, termination criteria may be any indication that the entire object is thawed.

If the criterion or criteria for termination is not met (step 560: no), it may be determined if variables should be changed and reset in step 580. If not (step 580: no), the process may return to step 550 to continue transmission of electromagnetic energy. Otherwise (step 580: yes), the process may return to step 520 to determine new variables. For example, after a time has lapsed, the object properties may have changed; which may or may not be related to the electromagnetic energy application. Such changes may include temperature change, translation of the object (e.g., if placed on a moving conveyor belt or on a rotating plate), change in shape (e.g., mixing, melting or deformation for any reason) or volume change (e.g., shrinkage or puffing) or water content change (e.g., drying), flow rate, change in phase of matter, chemical modification, etc. Therefore, at times and in response, it may be desirable to change the variables of transmission. The new variables that may be determined may include: a new set of MSEs, an amount of electromagnetic energy incident or applied at each of the plurality of MSEs, weight, e.g., power level, of the energy applied at one or more MSE(s) and duration at which the energy is applied at each MSE. Consistent with some of the presently disclosed embodiments, less MSEs may be swept in step 520 performed during the energy application phase than those swept in step 520 performed before the energy application phase, such that the energy application process is interrupted for a minimum amount of time.

The present invention is not limited to method 500 for applying electromagnetic energy to an object. Within the scope of the invention, alternative methods might be used for accomplishing the functions described herein, as would be understood by a person of ordinary skill in the art, reading this disclosure.

Figure 5:
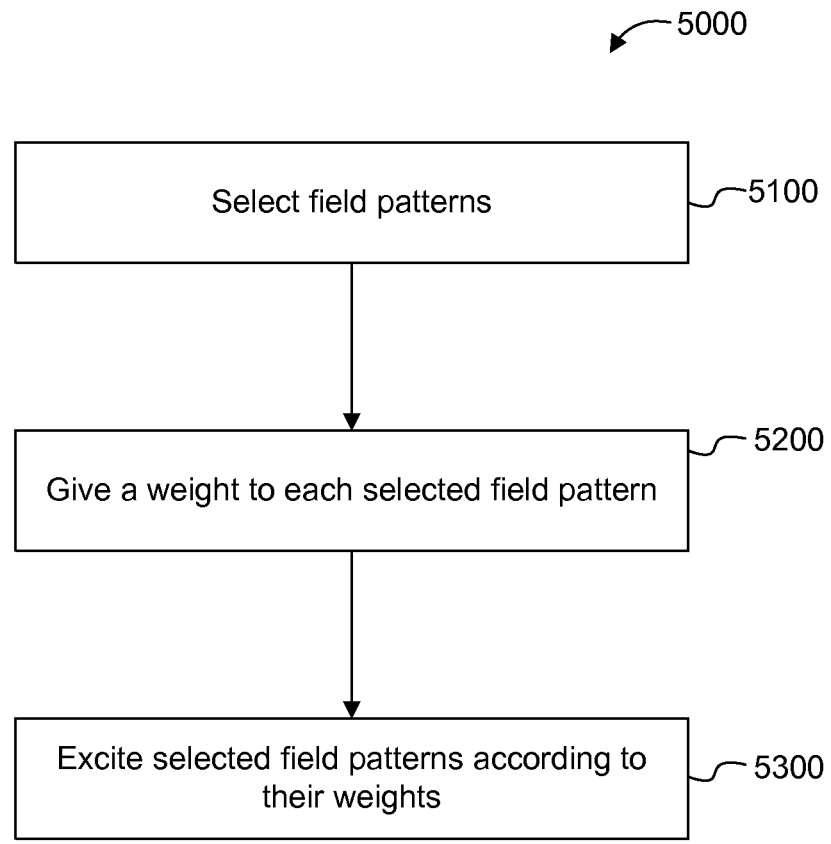
FIG. 5 is a flow chart of a method for exciting a predetermined spatial energy distribution in an energy application zone, in accordance with some exemplary embodiments of the present invention.

FIG. 5 is a flowchart of an exemplary method 5000 of applying a spatial EM energy distribution to energy application zone 9, by exciting a target EM field intensity distribution in the energy application zone. In some embodiments, exciting a target EM energy distribution may be achieved by determining weights associated with field patterns. As shown in FIG. 5, method 5000 may include selecting one or more field patterns, as indicated in step 5100. The selection may be based on a target EM field intensity distribution. The selection may be from multiple EM field patterns available to the apparatus (e.g., apparatus 100). The EM field patterns may be predetermined or may be determined based on a feedback from zone 9 (e.g., an EM feedback). Additionally or alternatively, the EM field patterns may include at least two linearly independent field patterns. Optionally, the EM field patterns may also include linear combinations of two or more modes. In some embodiments, step 5100 is carried out by a processor (e.g., processor 2030).

Method 5000 may also include a step of weighting the selected field patterns (step 5200). The weighting may be such that the sum of the field intensity distributions of the weighted field patterns equals to the target field intensity distribution, for example, to apply a first amount of energy to a first portion in the energy application zone or the object and a second amount of energy to a second portion in the energy application zone 9 or the object. The first and/or second amounts may be predetermined or may be determined based on a received feedback (e.g., an EM feedback–DR for example) and/or information based on input provided to the input unit (e.g., processing information or instructions from a user). In some embodiments, the first amount of energy may be different from the second amount of energy. The weighting may include the power at which the field pattern is excited and/or the time duration in which the field pattern is excited.

Method 5000 may also include a step of exciting the one or more selected field patterns, at step 5300. This excitation may be according to the weights of the field patterns. In some embodiments, the process may include, as part of excitation step 5100, selecting one or more radiating elements for exciting each of the selected field intensity distributions.

Some embodiments of the invention relate to an apparatus for controlling energy application to an object to be processed in an energy application zone, via at least one radiating element. The apparatus may include a user interface, e.g., a Graphical User Interface (GUI), which, in operation, may display to a user an image of the object placed in the energy application zone.

Figure 6:
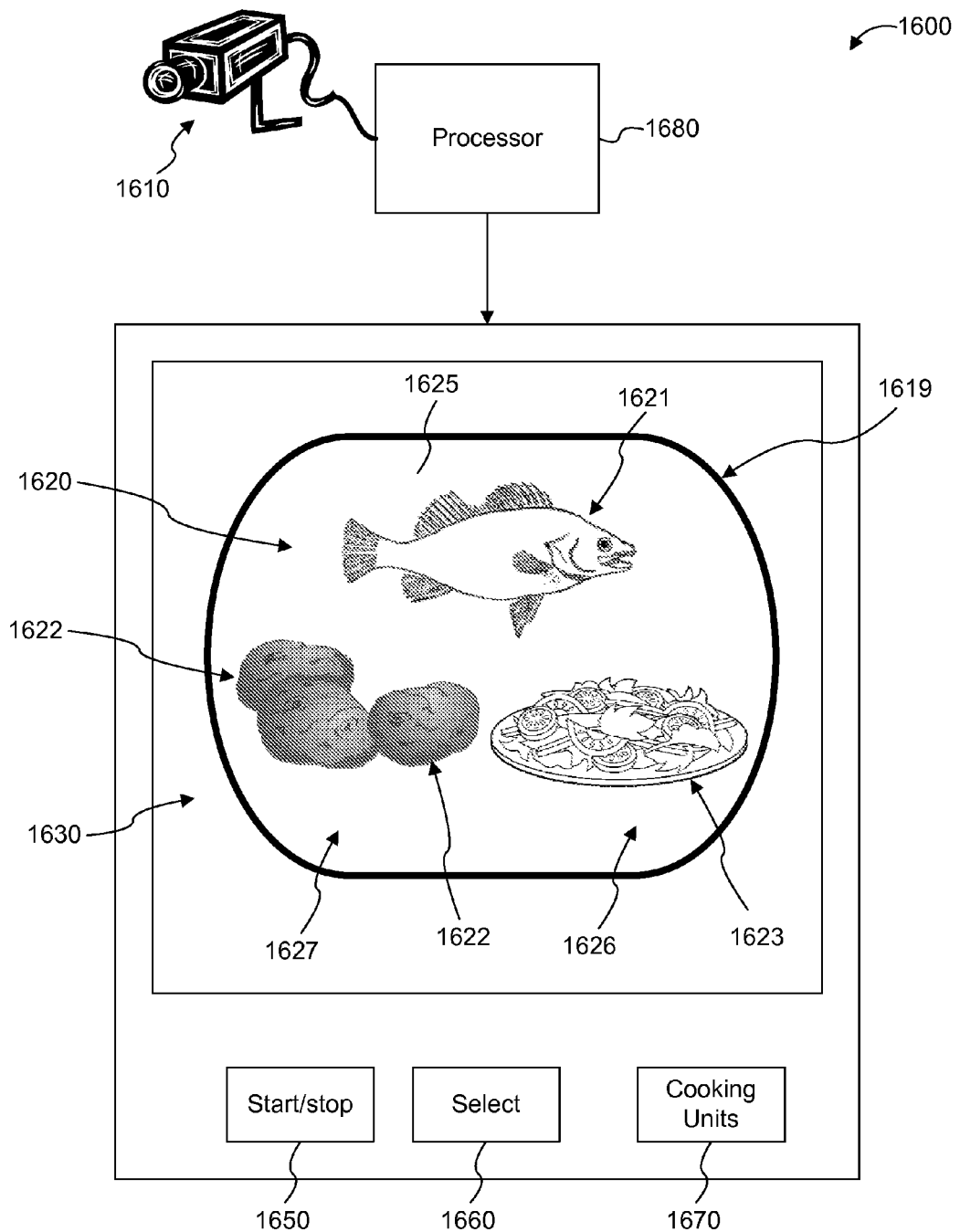
FIG. 6 is a diagrammatic representation of an apparatus for controlling energy application to an object placed in an energy application zone in accordance with some embodiments of the present invention.

Reference is now made to FIG. 6, illustrating apparatus 1600 for controlling energy application to an object to be processed in an energy application zone according to some embodiments of the invention. FIG. 6 emphasizes certain components associated with a user interface for presenting information to a user and for receiving input from a user. Apparatus 1600, however, may include other parts or components. For example, any of the parts or components associated with apparatus 100 of FIG. 1 and/or the apparatus of FIG. 3 may be included along with apparatus 1600.

As illustrated in FIG. 6, apparatus 1600 may include an image acquiring device, such as camera 1610, which, in operation, captures an image of the object in the energy application zone. The image (e.g., an optical image) of the object may be acquired from any image acquisition device. Such image acquisition devices may include a charge-coupled device (CCD) based image sensor or a complementary metal-oxide semiconductor (CMOS) based image sensor, a Scientific CMOS based image sensor, web camera, video camera or any other type of image acquiring device. The image acquiring device may be configured to capture an image of at least a portion of the object in the energy application zone. The image of the object may be generated based on visible light. Apparatus 1600 may include two or more image acquiring devices to provide a better correlation between the acquired images (from both devices) and the location and orientation of the object in the energy application zone.

Some image acquisition devices may generate images based on wavelengths of radiation outside of the visible light spectrum. For example, apparatus 1600 may include one or more infrared (IR) cameras, X-ray cameras, and or RF-based image acquisition devices. Any other suitable image capture device or image generating method may be used in accordance with exemplary embodiments of the present invention.

Apparatus 1600 may further include a user interface 1640. The user interface may include a display, and an input unit. The input unit portion of user interface 1640 may include any device or components that can be configured to receive an input from a user. The user input may be integrated with apparatus 1600 and/or interface 1640 or may be peripheral to apparatus 1600 and/or interface 1640. In some embodiments, the input unit may include a touch screen, a mouse (or other type of pointing device), a keyboard, a microphone, etc.

In some embodiments, the user interface may further include a processor for processing input received via the input unit into processing information. In some embodiments, the display and the input unit may be integral with each other, for example, in the case of a touch screen which allows both display of an image and receipt of input. Interface 1640 may be, for example, a graphical user interface (GUI), which may include any suitable components or attributes for providing information to a user and/or for receiving input(s) from a user. For example, interface 1640 may include a display screen 1630 configured to display an image or information to the user. Optionally, display screen 1630 may include a touch screen, such as a resistive touch screen, capacitive touch screen, surface capacitive touch screen, Surface Acoustic waves (SAW) touch screen, and/or IR touch screen, etc.

In some embodiments, display screen 1630 may be configured to provide the user with an image of the object to be processed. For example, as shown in FIG. 6, image 1620 may include an image of a plate 1619 (or any suitable tray, package, etc.) of various types of food. In certain embodiments, image 1620 may constitute an image of the inside of cavity 10 (FIG. 3) or energy application zone 9 where plate 1620 may be placed. As shown in FIG. 6, food items on plate 1619 may include fish 1621, potatoes 1622, and salad 1623.

While image 1620 may include an image of the energy application zone, image 1620 may also focus on one or more portions of energy application zone 9 or any objects placed in energy application zone 9. The term portion(s) is used herein interchangeably with any of the terms, area(s), segment(s), region(s), sub-volume(s). In certain embodiments, an image of a portion of zone 9 may include at least a part of the object to be processed. In some embodiments, the display may present (e.g., display) to the user selected portions of the object. For example, image 1620 may concentrate on one or more segment of plate 1619 (e.g., segment 1625, 1626, 1627) and the objects those segments contain. Apparatus 1600 may also be configured such that image 1620 concentrates on one or more individual objects for processing. For example, the display may be configured to present only one of a plurality of similar objects (e.g., to present only one representative potato when the object comprises three potatoes).

The scope of image 1620 may be varied. For example, in certain embodiments, a user may enter an input or instruction that can be used to acquire and display a user-specified image, for example. In some embodiments, the scope of image 1620 may be determined automatically.

In some embodiments, more than one image may be displayed on the user interface, e.g., simultaneously. Each image may be related or include different items of the object (e.g., a first image may display fish 1621 while a second image may display potatoes 1622). The user may select a desired display and/or a desired magnification of the object. For example, from an initial image acquired from the image acquiring device, the user may select desired portion(s) of the object to be further displayed. The selecting may include designating an area of zone 9 to image (e.g., on a touch screen or by a joystick), identifying a particular object to image, zooming in or zooming out relative to an initial image, etc. The process of selecting the desired area to be displayed may be repeated several times, according to the desire and convenience of the user. The image displayed may include a three dimensional (3D) image of the object, for example, in an isometric view, a two dimensional (2D) image, for example, an image of the upper surface of the object, etc. The image may include a slice, or slices of a 3D image, or any other kind of image of the object that may be displayed on a display screen.

In some embodiments, user interface 1640, optionally via display screen 1630 may be configured to allow the user to select at least a portion of the object or area of zone 9 to image by pointing to or otherwise designating the selected portion or area. Such pointing or designation may include using any type of user input unit, device, or method to provide input to user interface 1640 sufficient to enable apparatus 1600 to for example: acquire and display the desired image. Any type of input unit may be used, and the input unit may include any suitable combination of hardware and/or software components. In some embodiments, the input unit may include a mouse, keyboard, directional keys, touchpad, and/or joystick etc. Some examples for optional mice include a mechanical mouse, optical mouse, wireless mouse, touchpad and/or pointing stick. Additionally, a touch sensitive screen may be used as an input unit to provide input to interface 1640. In some embodiments, a user's selection may include a type of image of the object to be displayed on display screen 1630 (e.g., an optical image of the object; an infrared image; a thermal image developed based on temperature information associated with the object; a graphical representation of the object based, e.g., on energy absorption characteristics of the object; or any combination of these or other types of images).

Selection of the object, portion of an object, or area of zone 9, etc., to be imaged (or type of image to display) may be performed in any suitable manner consistent with the operating principles of the available input devices. For example, using a mouse or other pointing device, a desired portion of an object or area of zone 9 may be designated using a cursor to select the object or area (e.g. by moving the cursor to the desired portion of the object, dragging an image box over an area of interest, etc.). Selecting the desired portion may be done by clicking a key, for example "select" key 1660, or double clicking on the mouse, or any alternative way to select a pointed area. Optionally or additionally, the user may point out the desired portion of the object by touching the image of the object on a touch screen. The image may be displayed on the touch screen and the user may select at least a portion of the object by touching the portion in the image. The user may select more than one portion of the object, the whole object, several items within the object or any other part displayed. In some embodiments, the touch screen may be a multi-touch screen (e.g., capable of detecting more than one touch simultaneously) and the user may select more than one portion of the object simultaneously. For example, the user may select a plurality of portions of the object and instruct the same processing instruction to all the selected portions. A user may also zoom in, zoom out, select, scroll, pan, etc. using various gestures (e.g., flicking up or down, pinching fingers (or stylus, etc.) together, pushing fingers apart, sliding fingers up or down, left to right, or in any direction along a touch sensitive screen).

The user may further provide information via interface 1640 that can be used to determine desired or target processing conditions for the object. Such input may be provided by any suitable type of input unit (e.g., any device or method for accepting an input from a user and providing that input to one or more processors associated with the processing apparatus). Depending on the requirements of a particular embodiment or on the operational scheme of a particular embodiment, suitable input units may include keyboards, mice, touch screens, microphones, motion recognition devices, etc. The information received from the user can include any information from which processing information (e.g., processing instructions) can be derived, understood, calculated, determined, ascertained, etc. For example, for any portion of an object, the input provided to the input unit by the user may include a target temperature, a target humidity level, a desired level of doneness, a "cook" or "not cook" designation, an amount of energy to transfer, a target cooking time, number of cooking units to apply, etc.

Based on the information received from the user via interface 1640, processing information can be determined for selected portion(s) of the object. The selected portions may be selected by the user based on the image of the object. For example, a user may select a first portion of an object shown on a display and provide an input relating to how the first portion of the object should be processed. Further, the user may select a second portion of the object shown on the display (or larger number of additional portions of the object) and provide additional input relating to how the second portion (or other portions) of the object are to be processed. The input may be implicit or explicit. For example, the user may provide explicit input relating to how each portion of the object should be processed. Alternatively, the user may provide explicit input relating to only one or some of the portions of the object (or even with respect to none in some cases), and other processing information can be inferred for other portions of the object, for example, from defaults of the processing apparatus, or any other source of information.

The input provided by the user may be passed along to one or more processors (for example, controller 101, processor 2030, and/or processor 1680), which, in turn, may generate processing information based on the input. This processing information may be directed to a first portion of the object to be processed and to a second portion (or any number of additional portions) of the object to be processed. This processing information may be used by the processor or one or more other processors to process the object, e.g., by causing application of RF energy to the selected portions of the object according to the processing information generated based on user input. In some embodiments, the processing information may be generated in order to achieve a first processing result in the first portion of the object and a second processing result in the second portion of the object (or in any number of additional portions of the object). The first processing result for a first portion of the object may be the same as or similar to the processing result for a second portion of the object. Alternatively, the first processing result for the first portion of the object may be different from the processing result for the second portion of the object.

The processing information may include any type of information (e.g., values of parameters, profiles, etc.) that can be used or applied during processing of an object by EM energy. For example, the processing information may include a desired amount of energy to be dissipated or absorbed in a portion or portions of the object, a desired target temperature profile of a portion or portions of the object, a desired degree of doneness of a portion or portions of the object, a desired target humidity of a portion or portions of the object, a desired density of a portion or portions of the object, a desired pH value of a portion or portions of the object, and/or desired cooking units to apply to a portion or portions of the object. The term cooking units (CU) may refer to values associated with any parameter that may be related to a process for applying energy to an object, changing the temperature of an object, etc. For example, cooking units may be proportional to an amount of energy to be dissipated in a portion of the object. In one embodiment, 10 CU may be equal, for example, to 100 KJ. Alternatively, the cooking units may be proportional to the amount of energy per weight that needs to be dissipated in the object. For example, 7 CU may be equal to 7 KJ/100 gm.

Additionally, a user, upon selecting a desired portion or portions of the object for processing, may provide more detailed input to interface 1640 (e.g., in the form of instructions that more closely resemble (or may even constitute) processing information for use in processing an object with RF energy). For example, after selecting a portion of an object to process, the user may enter processing instructions for the selected portions. Any suitable instruction related (either directly or indirectly) to the processing of a particular object by EM application may be provided and used in embodiments of the present invention. Further, these instructions may be entered using any suitable input device or technique. For example, instructions may be provided by keys (either soft keys or mechanical keys) associated with user interface 1640 (e.g., keys 1650, 1660, and/or 1670); a keyboard, either a mechanical keyboard associated with apparatus 1600 or a virtual keyboard provided as part of user interface 1640; or by any other input device or method. Additionally or alternatively, a user may be provided with one or more dropdown boxes or menus with processing instructions that may be selected. In such embodiments, a user may select a desired instruction, for example, by pointing and clicking on, tapping, scrolling to, etc. an option from a menu displayed on the screen.

In some embodiments, the user may select several instructions for different portions of the object or different items within the object. The instructions may be substantially similar or different for each portion or each item. For example, the user may select to cook fish 1621 with 300 KJ or with 30 CU. The user may alternatively specify that a temperature of fish 1621 is to be raised to a certain temperature, e.g., to 75° C. Similarly, the user may instruct apparatus 1600 to cook potatoes 1622 with 700 KJ, 70 CU or up to 95° C. Notably, the user may also provide instructions to keep salad 1623 cold, by, for example, not applying EM energy to the salad portion of the object. Exemplary methods for applying a different amount of energy to different portions of an object, or different items within and object, are described with respect to FIGS. 5, 7A-7C, 8, and FIGS. 9A and 9B.

In some embodiments, apparatus 1600 may include a processor 1680 configured to control EM energy application to energy application zone 9 (FIG. 1). Processor 1680 may be configured to determine a value indicative of energy absorption in at least a portion of the object. Processor 1680 may be similar or different from processor 2030 (FIG. 3) or controller 101 (FIG. 1). Processor 1680 may be the same as or may be embedded in processor 2030 or controller 101. Similarly, processor 1680 may include processor 2030, controller 101, or parts thereof. In some embodiments, processor 1680 may be added to apparatus 100 in addition to or instead of controller 101 or computation system 92. User Interface 1640 may be added in addition to or instead of interface 130. Processor 1680 may be added to or replace processor 2030 in the apparatus of FIG. 3. The value indicative of energy absorption (either absorbable or absorbed) in at least a portion of the object may be determined or calculated for a plurality of MSEs in accordance with some embodiments of the present invention. Processor 1680 may be connected to user interface 1640 through a wireless or wired connection. Processor 1680 may be further configured to receive the processing instructions provided by the user via user interface 1640 and to control energy application to the energy application zone, for example, at a plurality of MSEs, based on the determined value indicative of energy absorption in the object and the processing instructions, according to some embodiments of the invention. Optionally, the processing (e.g., application of EM energy) of the at least one portion of the object may begin after the user presses or touches "start" key 1650.

In some embodiments, processor 1680 may be further configured to process an image acquired, e.g., from image acquiring device 1610 in order to correlate between the location of the object in the image and the location of the object in the energy application zone. The image processing may include scaling of the image. Processor 1680 may be configured to adjust aspects of the energy application based on the processed image.

In some embodiments, the value indicative of energy absorption in at least a portion of the object may include, for example, a scalar, vector, or matrix. In some embodiments, a vector or matrix value may include scalars, each indicative of the energy absorption in a different segment (portion, area) of the object. Collectively, a plurality of values, each indicative of energy absorption in a different segment of the object, may provide a spatial absorption value. Such values may be included in a vector or matrix, which may also be referred to as a spatial absorption value. The different segments of the object may overlap with one another to some degree, or may be separated from one another, e.g., by a space or volume not included in any of the portions to be processed.

Processor 1680 may be configured to convert the spatial absorption value to a graphical image of the object (e.g., generate a graphical image of the object based on the spatial energy absorption value). The graphical image may be presented to the user on display 1630. In some embodiments, the energy application zone or the object may be divided (e.g., discretized) into a plurality of segments (e.g. areas, volumes) and a value indicative of energy absorption in each segment may be calculated or determined to obtain the matrix of values each correlated with a different segment in the energy application zone or the object.

The value indicative of energy absorption may be associated with any parameter that may affect or be related to the absorption of EM energy. Examples of such parameters may include a real component of a dielectric constant, an imaginary component of a dielectric constant, electrical conductivity, or relations and combinations thereof (for example tan δ, also referred to as loss tangent). In some embodiments, the apparatus may be configured to convert RF energy absorption values to an image of the object (e.g., to generate an image of the object based on the RF absorption values). Such an apparatus may be referred to as an RF-based image acquisition device. A detailed description of a method for determining spatial energy absorption information and values and a spatial energy absorption is described in regard to FIGS. 7A-7C, 8 and 9. The graphical image may have substantially the general shape of the object. Optionally, processor 1680 may be further configured to combine or overlay the image acquired from the image acquiring device 1610 and the graphical image based on the spatial absorption value. The combined image may be displayed to the user on display 1630 in user interface 1640.

The spatial value indicative of energy absorbable in the object may include a loss profile. The term "loss" may include any electromagnetic energy that is not reflected back from within the energy application zone. The term "loss" may also refer to dielectric loss. The term "loss profile", which also may be referred to as a loss pattern, image, distribution, etc., may include any spatial distribution of loss in the energy application zone.

An energy application zone may be discretized, such that a unique address is associated with each discretized segment, enabling field patterns to be spatially mapped to particular addresses. FIGS. 7A-7C and 8 illustrate examples of energy application zones divided into segments. The term discretization may, for example, also be referred to as division, separation, or partition.

The discretization of an energy application zone into segments may be predetermined. In one case, a processor may acquire the predetermined discretization information, through, for example, a look up table, information stored in memory, or information encoded in the processor. Alternatively, discretization may occur dynamically using at least one processor (e.g., processor 2030 as illustrated in FIG. 3). For example, when known dimensions of the zone are provided to the processor, the processor may overlay a regular or irregular division pattern on the volume, divide the zone into segments, and assign an address to each segment.

Figure 7A:
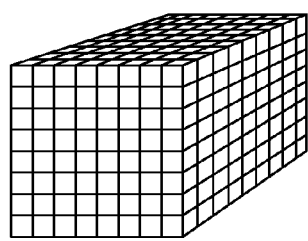
FIGS. 7A-7C illustrate exemplary energy application zone discretization strategies in accordance with the invention.
Figure 7B:
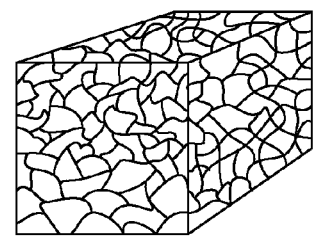
Figure 7C:
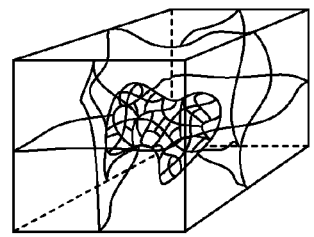

The discretization strategy may depend on many factors, including but not limited to: a desired resolution, properties of the loss profile, and available field patterns. The regions may be of a regular or irregular shape. For example, in 3D cases, the regions may be regular cubic- or rectangular-shaped, as illustrated in FIG. 7A. In this case, if the size (e.g. volume) of the zone is SL, and a desired resolution may require the object to include at least 100 regions, then the average size of each region may be, for example, SL/100. Alternatively, the regions may have any irregular shape depending on particular needs. For example, the energy application zone may be divided into somewhat random regions as shown in FIG. 7B. In some embodiments, the division may occur by taking into account the location of an object in the zone and/or the characteristics of a specific field pattern applied to the zone (for example as illustrated in FIG. 7C).

In certain locations of the object, the size of the divided regions may be smaller than other locations. In other words, the density of regions may vary across the entire object. For example, the dividing strategy may vary depending on whether a region corresponds to a portion of an object in the energy application zone that is targeted for energy application; whether the region corresponds to a region of the zone where no portion of the object is located, or to a region comprising a portion of the object that is not targeted for energy application (each of the two latter regions may be referred to as "void zones"). In some circumstances, the targeted portion of the object may include the entire object. In some circumstances, a non-occupied portion of the zone may be treated as part of the void zone. According to an exemplary strategy, the entire void zone may be treated as a single region. In another exemplary strategy, the void zone may be divided into a plurality of regions in a similar manner as the targeted portion inside the object. In this case, the dividing may be carried out in the entire energy application zone, regardless of the spatial occupation of the object or the spatial location of the targeted portion of the object. Alternatively, the dividing may be carried out separately for the zone occupied by the targeted portion of the object and the void zone. In yet another example, the void zone may be divided into a plurality of regions in a different manner than that in the targeted portion of the object. For example, the average size of regions in the void zone may be larger than that inside the targeted portion of the object, as illustrated in FIG. 7C. In other words, the density of regions in the void zone may be lower than that inside the targeted portion of the object. The illustrations of FIGS. 7A-C are exemplary only. An infinite number of discretization strategies are contemplated within the scope of the invention.

Figure 8:
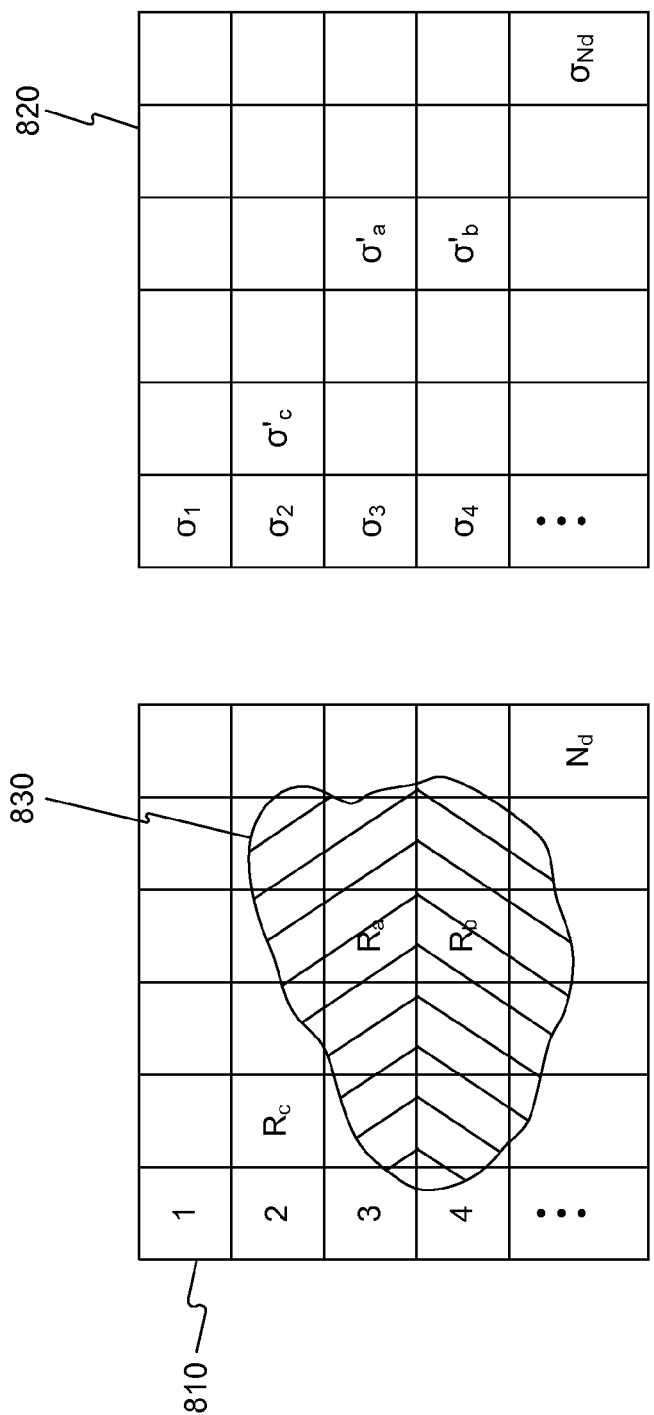
FIG. 8 illustrates an exemplary loss profile in the form of an image, consistent with principles of the invention.

Discretization may occur just within an area occupied by an object, or an entire energy application zone may be discretized. An example of a discretized energy application zone 810 is discussed below with reference to FIG. 8. In FIG. 8, an energy application zone 810 may be divided into multiple regions with each region having substantially the same regular squared shape. However, it is contemplated that the method described below may apply to discretizations where zone 810 is divided into regions of irregular shapes and/or unequal sizes. The regions may be labeled from the upper left corner to lower right corner as 1, 2, 3, . . . , Nd. An object 830 may include more than one regions, e.g., regions Ra and Rb. In this example, it may be assumed that the set of MSEs selected may be represented by $[\theta_1, \theta_2, \ldots \theta_{Nm}]$. Each MSE may correspond to a known field pattern inside the energy application zone 810. Since the energy application zone has been discretized into Nd regions, for each MSE $\theta_j$, a corresponding known field pattern may be represented by a series of local electrical field intensities $[I1,j, I2,j, I3,j, \ldots, INd,j]$. The electrical field intensity at a particular region of the zone may be proportional to the square of the electrical field amplitude at that region. Therefore, for all applied MSEs, the field patterns may be collectively written in matrix form as:

$$\begin{vmatrix} I_{11} & I_{21} & I_{31} & I_{41} & \vdots & I_{Nd1} \\ I_{12} & I_{22} & I_{32} & I_{42} & \vdots & I_{Nd2} \\ \vdots & \vdots & \vdots & \vdots & \vdots & \vdots \\ I_{1Nm} & I_{2Nm} & I_{3Nm} & I_{4Nm} & \vdots & I_{NdNm} \end{vmatrix}$$

This matrix, referred to as the I matrix, may be determined after the MSEs and the discretization are determined.

For each of the plurality of field patterns, a processor may be configured to determine an amount of power dissipated in the energy application zone. An amount of power dissipated in the energy application zone may be the amount of power that is absorbed by any energy absorption medium in the zone and may be measured directly or indirectly. As an example of direct measurement, a temperature sensor may be placed at various locations in the zone, and the amount of power dissipated in the energy application zone may be determined based on a temperature rise observed by the temperature sensors.

The invention may include a method for applying electromagnetic energy to an object. Such an energy application may be accomplished, for example, using at least one processor configured to implement a series of steps such as those set forth in process 1000 of FIG. 9A. Process 1000 may be used to dynamically determine a loss profile 820 for a given object 830 (FIG. 8).

Figure 9A:
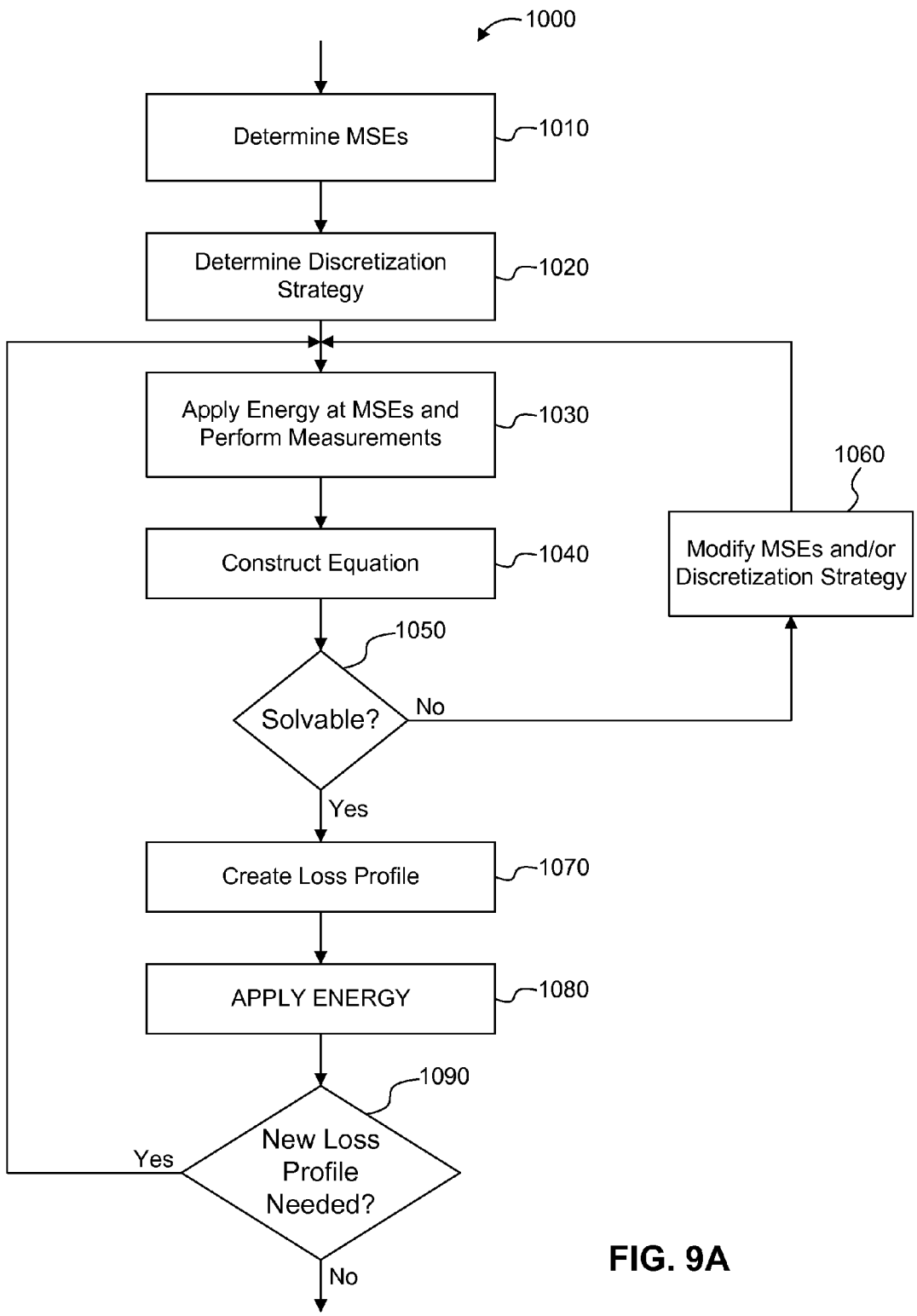
FIG. 9A is a flow chart of exemplary steps of applying electromagnetic energy to an energy application zone consistent with principles of the invention.

The process may include causing a source of electromagnetic energy to apply a plurality of electromagnetic field patterns to the object in an energy application zone. As indicated in FIG. 9A, the processor may determine a set of MSEs for use in step 1010. As discussed previously, an MSE may correlate to a known field pattern in the energy application zone. Therefore, by determining a set of MSEs, the processor may control application of electromagnetic energy to the energy application zone and generate a set of known field patterns in the zone.

The method of constructing a controlled EM field pattern inside the energy application zone from a predetermined set of field patterns may be referred to as "EM spatial filtering." The term "filtering" refers to an ability to discriminate spatial locations and the field intensities thereof in terms of a set of known EM field patterns. And since each of the predetermined set of field patterns can be correlated with one or more controllable MSEs, it is possible to represent a controlled EM field pattern in terms of one or more MSEs. It should be understood that there may be more than one MSE or MSE combination available to achieve a given field pattern. The choice of MSE to achieve a particular field pattern may be application dependent.

In step 1010, a set of MSEs suitable for the process may be determined. For example, a processor may control the energy source to supply EM energy (to the radiating elements) at a plurality of frequencies. In this case, the plurality of frequencies may serve as controllable MSE variables in this process. Alternatively or additionally, the processor may control the energy source to supply EM energy in a plurality of amplitudes. In this case, amplitude may serve as controllable MSE variables in the process.

The processor may cause the source to apply the desired field patterns to an energy application zone (e.g., zone 810 in FIG. 8), by executing the selected MSEs. Consistent with some embodiments, exemplary apparatuses as shown in FIGS. 1 and 3 may be used to apply the field patterns.

In step 1020, a discretization strategy may be applied to divide the energy application zone (e.g., 810 in FIG. 8) into a plurality of regions. In some embodiments, the processor may dynamically discretize the space in a manner that allows solving the equations for the loss profile. This may be done, as follows: First, the processor may either learn, or may be preprogrammed with the coordinates of each hot spot in each field pattern corresponding to each MSE. This may be accomplished because, as discussed earlier, the MSEs result in predictable field patterns with predictable hot spots. Therefore, when the processor receives an indication that the detector has received feedback indicative of absorption during a particular MSE condition, the processor may determine that an object is located in one of the hotspots corresponding to that MSE condition. The more MSEs that are tested for feedback, the more information the processor learns about the location and the absorptive properties of the object in the energy application zone. Over a series of such measurements with differing MSEs, the processor can ascertain the location of the object in the space and/or the absorptive properties in each discrete region.

The foregoing is but one discretization strategy, and the invention is not limited to any particular discretization strategy. Rather, a discretization strategy in accordance with a presently disclosed embodiment may include any suitable method for causing the processor to represent the energy application zone or the object in it as multiple regions. FIG. 8 is but one example of a discretized energy application zone 810, where the object 830 occupies multiple regions.

In step 1030, the processor may cause application of energy at MSEs and control the EM energy to be applied into the energy application zone. For each applied MSE, the energy loss in the energy application zone may be measured. For example, such energy loss may be measured by detecting the incident energy, transmitted from the radiating elements, and the reflected and coupled energies returned to at least one of the radiating elements. The difference between the incident energy and the returned energy may correspond to the energy loss in the energy application zone. In one example, the application time of each MSE may be the same. In this case, the energy loss can be represented by power loss P, which may be determined from the power transferred to and returned from the energy application zone. Because for each MSE ($\theta j$) the power loss $P_j$ may be related to the local intensities $I_{ij}$ as follows:

$$\tfrac{1}{2}(\sigma_1 I_{1j} + \sigma_1 I_{1j} + \ldots + \sigma_{Nd} I_{Ndj}) = P_j$$

the measured power loss P, the matrix I, and the unknown loss profile $\sigma$ may satisfy the following equation constructed from the measured power loss P and known I (step 1040): $\sigma I = P$.

The matrix representation above is just one way to represent the equation. In some embodiments, a series of linear equations may be constructed as follows:

$$\tfrac{1}{2}(\sigma_1 I_{1j} + \sigma_2 I_{2j} + \ldots + \sigma_{Nd} I_{Ndj}) = P_j$$

In certain embodiments, loss profile $\sigma$ may be solved mathematically from the above equation. In other embodiments, the equation may not be solvable for $\sigma$, e.g., the I matrix may be singular. In some other cases, while the equation may be solvable, the solution may not provide the desired level of accuracy because, for example, the I matrix may be less than optimal mathematically. Therefore, in step 1050, a check may be performed to determine if the equation is solvable at a desired accuracy (referred to herein as "solvable"). For example, a processor may calculate the determinant of the I matrix and determine if it is singular. As another example, a processor may calculate the condition number of the I matrix to determine if there are any mathematical issues with the I matrix.

If the above equation is solvable (step 1050: yes), in step 1070, the loss profile a may be solved from the equation using methods such as direct inversion, or various iterative methods. If the equation is not solvable (step 1050: no), step 1060 may be conducted where the MSEs and/or the discretization strategy is modified and process 1000 goes back to step 1030. For example, a new set of MSEs may be chosen and applied to the zone, and power dissipated in the zone may be measured accordingly for each new MSE.

In step 1080, electromagnetic energy may be applied to the energy application zone based on the loss profile. In some embodiments, a plurality of differing amounts of electromagnetic energy may be selectively applied to differing regions of the energy application zone. For example, a processor may first select a plurality of MSEs to be applied, and each of the plurality of MSEs may generate a different field pattern in the energy application zone. Then the processor may determine the amount of power to be used for applying each MSE and/or the amount of time for delivering the power for each MSE, based on the desired amount of electromagnetic energy to be applied to each region and the created loss profile.

In step 1090, a determination may be made as to whether a new loss profile is needed. In some embodiments, a new loss profile may be needed at predetermined time intervals, such as, every five seconds or at other intervals. In some other embodiments, the determination may be based on the magnitude of a difference between two recurrently determined loss profiles. In yet some other embodiments, the determination may be based on characteristics of the object, such as size, position, shape of the object, and/or substances contained in the object. If a new loss profile is needed (step 1090: yes), process 1000 may go back to step 1030 for determining a new loss profile. If a new loss profile is not needed (step 1090: no), process 1000 may be terminated.

In some exemplary embodiments, the processor may regulate the source to apply energy repetitively to the energy application zone. For example, the processor may apply an MSE and cause its corresponding field pattern in the energy application zone for a predetermined time period, then apply another MSE and cause another field pattern in the energy application for another predetermined time period. The duration and rates at which energy is applied at different MSEs may vary. For example, in some embodiments, energy may be applied to the energy application zone 120 times per second. Higher (e.g. 200/second, 300/second) or lower (e.g., 100/second, 20/second, 2/second, 1/second, 30/minute) rates may be used, as well as uneven energy application rates.

In some embodiments, a set of MSEs may be applied sequentially during a period of time (herein referred to as "a scan"). And the scan may also be repeated at a predetermined rate or after a predetermined interval. At times, a scan sequence (e.g., one or more scans) may be performed once every 0.5 seconds or once every 5 seconds or at any other rate, such as higher, lower or intermediate. It is to be understood that the MSE selection in different scans may or may not the same.

After a certain amount of energy is transmitted to or dissipated in the object or a portion of the object, a new scan may be performed. For example, a new scan may be performed after 10 kJ or less or 1 kJ or less or several hundreds of joules or even 100 J or less are dissipated in the load. In another example, a new scan may be performed when one of the above amounts of energy are dissipated by 100 g of the load, or by 50% of the load volume.

In some cases, the processing instructions for processing an object in zone 9 may be provided via a machine readable element, e.g., an RF/bar-code readable tag (e.g., programmed with previous scanning information or presets) or using temperature sensors.

In some embodiments, apparatus 1600 (FIG. 6) may comprise one or more thermometers (i.e., thermal sensitive devices) (not illustrated), including, for example, a thermocouple, a temperature transmitting tag (TTT), pyrometer, and/or an IR sensor, etc. The one or more thermometers may be configured to measure or detect or sense the temperature in one or more portions of the object. Optionally, the thermometers may measure (e.g., acquire temperature readings) of the temperature at different places on or within the object, and processor 1680 may be configured to receive outputs from the thermometers and define a spatial temperature profile of at least a portion of the object based on the measured temperatures and locations at which the temperatures were measured. For example, the thermometers may include several thermocouples placed in several locations (either within one object or a plurality of objects), and the processor may be configured to define a spatial temperature profile, correlating between the spatial positions (of the several thermocouples) and the temperatures measured by the thermocouples. Optionally, the thermometer may include several temperature transmitting tags (TTTs) each associated with a different portion of the object (e.g., each of the TTTs may be placed in or on a certain item in the object), wherein each TTT may transmit the measured temperature to the processor. Additionally or alternatively, the thermometers may include one or more IR sensors that receive IR signals indicative of the temperature at an origin of the IR signals.

The thermometers may be configured to receive IR signals from various portions of the object, and the processor may be configured to define a spatial temperature profile, based on the spatial locations of the various portions of the object from which each IR signal was received and based on temperatures indicated by each of the IR signals. A spatial temperature profile may include assignments of temperatures to different places in the energy application zone, for example, of different items, and/or other different portions of the object. Temperature measurements may be performed prior to energy application, during energy application, or after energy application. Processor 1680, for example, may be configured to generate an image for display based on the spatial temperature profile determined based on the outputs of the thermometers.

The temperature measurements may be presented (e.g., displayed) to the user on screen 1630, before, during and/or after the processing (e.g., the energy application). The user may provide processing instructions relating to the desired temperature to be reached in at least a portion of the object. Based on desired temperature instructions, processor 1680 may be configured to adjust the energy application such that the desired temperature according to the provided instructions may be measured in at least a portion of the object.

Figure 9B:
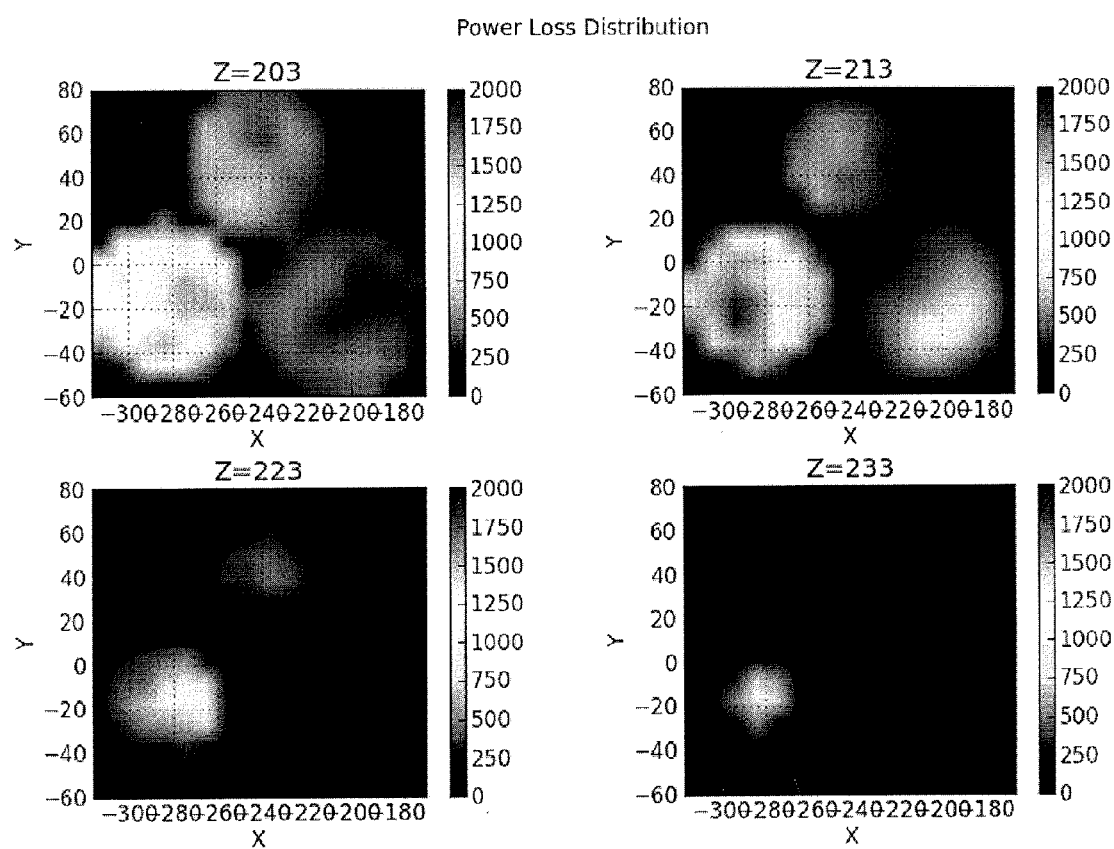
FIG. 9B is a diagrammatic representation of simulation results showing different items heated to differing extents using RF energy, consistent with some embodiments of the invention.

FIG. 9B is a diagrammatic representation of four horizontal cross sections in a dielectric loss distribution (corresponding to heat distribution) calculated for a cavity having therein three items: red cabbage (at the upper part of the center), meat ball (at the lower left corner), and mashed potato (at the lower right corner). The dielectric loss function was calculated for conditions where RF energy is applied to the cavity via four radiating elements at a plurality of MSEs. Each of the three items was represented in the calculation by a body having a diameter of about 7 cm, and a dielectric constant of the corresponding food item. The dielectric loss in the energy application zone was calculated for various MSEs, which differed from one another in frequency, amplitude, and phase. Ten MSEs, for which the calculated dielectric loss distribution across the meat ball (the item at the lower left corner) differed most markedly from the dielectric loss distribution across the other items, were selected, and their calculated dielectric loss distributions averaged. Cross sections in the average of the energy loss distributions calculated for the selected MSEs are shown in FIG. 9B. As may be seen, much more energy is lost in the meat ball than in the cabbage or in the mashed potato. Selection of other MSEs allowed obtaining preferential dielectric loss at the mashed potato or at the cabbage.

Figure 10:
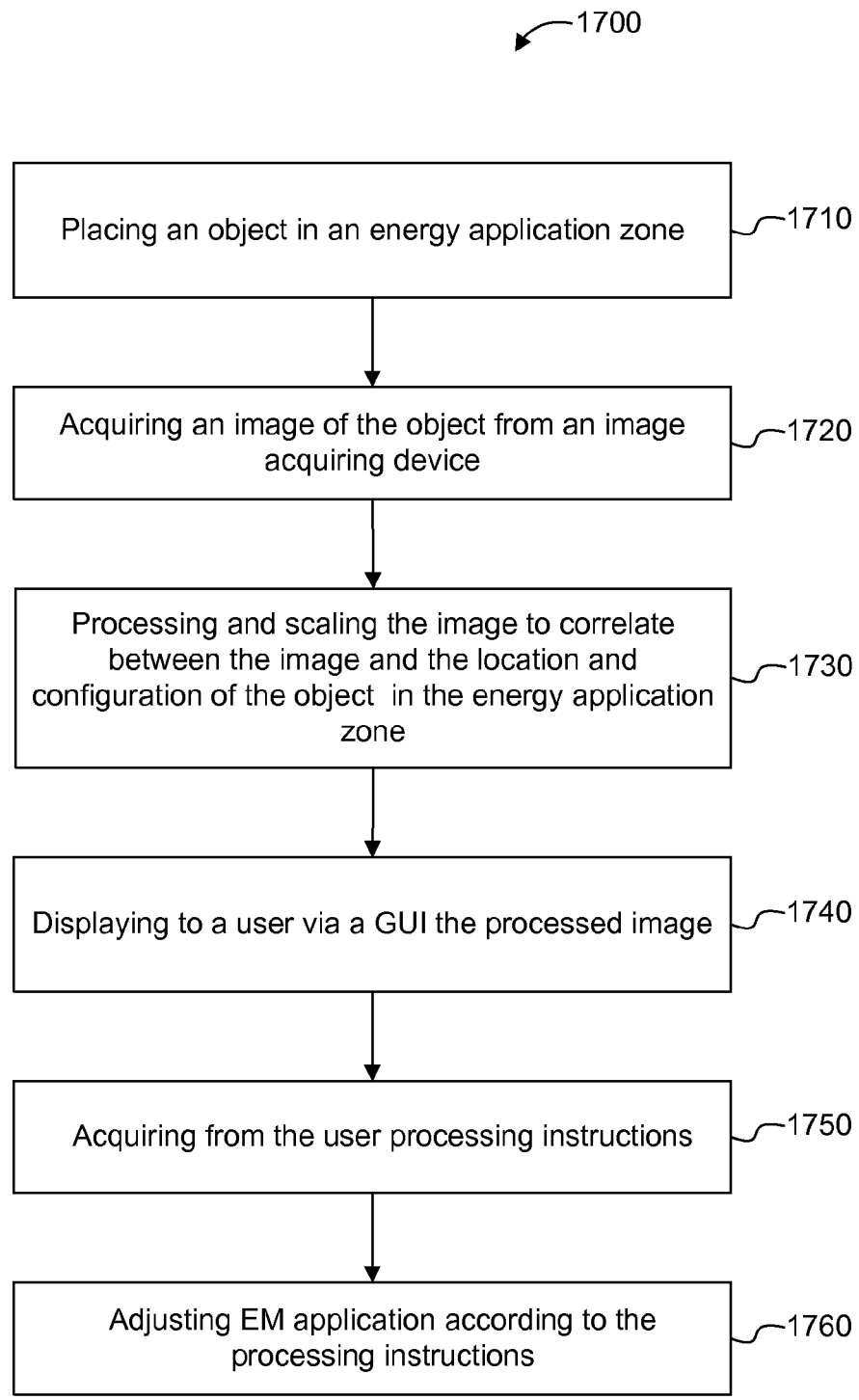
FIG. 10 is a flow chart of a method for controlling electromagnetic energy application to an object in accordance with some embodiments of the present invention.

Reference is now made to FIG. 10. A method 1700 for controlling energy application to an object according to some embodiments of the invention. An object to be processed, for example a plate of food to be cooked or heated, is placed in an energy application zone (e.g., cavity 10) in step 1710. In step 1720, an image of the object, e.g., image 1620, is acquired from an image acquiring device, for example camera 1610. In some embodiments, the image may be processed to obtain a processed image, and optionally scaled, by a processor (e.g., processor 1680, 2030 and/or 101), to correlate between the location and configuration of the object in the image and the location and configuration of the object in the energy application zone (in step 1730). In some embodiments, the processing on the image may include: zooming, filtering, e.g., digital filtering, image recognition processing or any other processing on images known in the art as such. In some embodiments, the processing on the image may be performed by the image acquiring device (e.g., by a processor included therein), and the processed image may be sent to the processor. The acquired image and/or processed image may be displayed to the user in step 1740, on a user interface, for example interface 1640. The user interface may include a GUI (e.g., a GUI comprising an input unit or a stand-alone input unit) configured to allow the user to select certain portions of the object (at least one portion of the object) and provide processing instructions for each selected (e.g., designated) portion (in step 1750). The processing instructions may include an amount of energy to be dissipated in each portion of the object, a desired final temperature for each area of the object, CU (cooking units) for each area of the object, final pressure of the object, final humidity level for each area of the object and/or any other processing instructions that may assist in adjusting or controlling the energy application to at least one portion of the object. A final result (e.g., final temperature, final humidity level) may refer to a desired result of the processing, e.g., a desired result after termination of energy application.

EM energy application to the energy application zone (e.g., cavity 10) may be determined or adjusted by the processor (e.g., processor 1680, 2030 and/or 101) according the processing instructions provided by the user (in step 1760). Optionally, a value indicative of energy absorption at a plurality of MSEs may be determined according to some embodiments of this invention (e.g., step 530 in method 500) and the energy application at a plurality of MSEs may be adjusted according to the determined value and optionally the processing instructions.

In accordance with some aspects of the invention, processor 1680 may be configured to acquire a spatial energy dissipation (or absorption) value indicative of energy dissipation or absorption information from the object (e.g., object 11). The spatial energy dissipation may be in a form of a loss profile. The processor may convert the spatial energy dissipation value to a graphical image, e.g., 2D or 3D graphical image. The graphical image may substantially have the configuration of the object, e.g., shape, size, orientation, and/or position in the cavity. The graphical image may be displayed to a user, for example, on a display screen (e.g., screen 1630). Different energy absorption levels may be presented in different colors. A scale may be attached to the image to help the user in correlating between the different energy absorption levels and the different colors. For example, high energy absorption levels may be presented by the "red" family colors and low energy absorption levels may be presented by the "green" family colors. The graphical image may be presented as a 3D isometric representation of the spatial energy dissipation value, and the user may select different points of view and different angles in which the image may be displayed. The graphical image may be presented as 2D image representing one or more slices or projections of the 3D image. The user may select a 2D representation of the spatial energy dissipation value. The user may further instruct processor 1680 via user interface 1640 to display a specified cross section of the object in a selected area of the image, e.g., by designating the desired section on the user interface. The user may use any pointing device, e.g., a mouse, to point and select a desired section, optionally by dragging the cursor of the mouse over the desired area.

Figure 11:
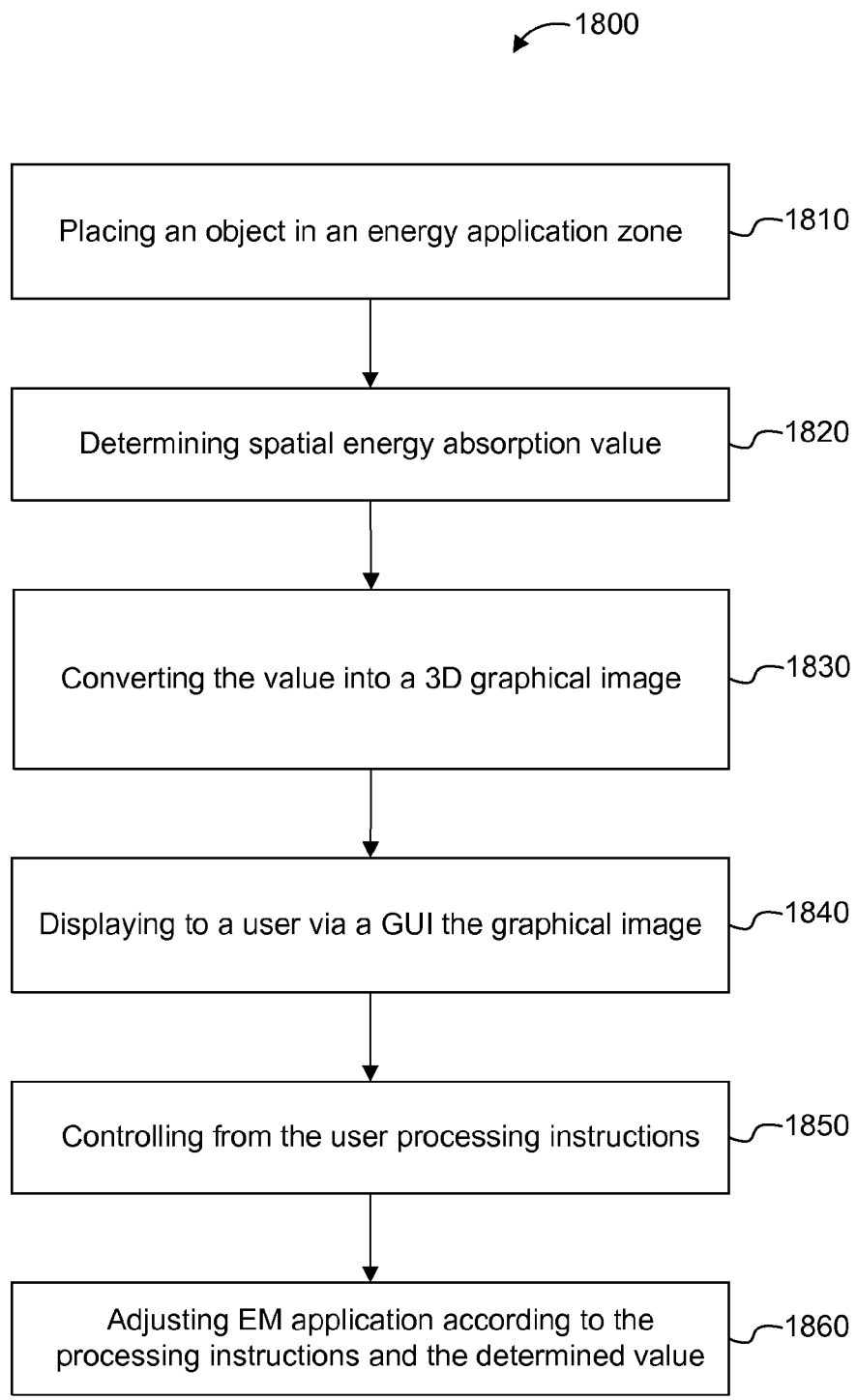
FIG. 11 is a flow chart of a method for controlling electromagnetic energy application to an object in accordance with some embodiments of the present invention.

Reference is now made to FIG. 11 and method 1800 for controlling electromagnetic energy application to an object in accordance with some embodiments of the present invention. An object to be processed, for example, food to be cooked or heated, is placed in an energy application zone (e.g., cavity 10) in step 1810. In step 1820, a spatial energy absorption value may be determined. For example, determining energy absorption values of different areas in the energy application zone or object may include exciting a plurality of electromagnetic field patterns in the energy application zone, for example, by applying energy at different MSEs. Determination of energy absorption values may further include determining an amount of power dissipated in the energy application zone at each of the plurality of field patterns. The energy absorption values of different portions in the energy application zone or object may then be determined based on the amounts of power dissipated at each of the plurality of field patterns and knowledge of the spatial energy distribution of each of the excited field patterns. A spatial energy absorption value may be determined based on the energy absorption value of different areas in the zone. The determined spatial energy absorption value may be converted into a 2D or 3D graphical representation, for example a 2D or 3D image (in step 1830). The graphical representation may have substantially the shape of the object. Optionally, different energy absorption levels may be marked and/or associated with different colors. For examples the "red" family of colors may be associated with portions that absorb substantially high amounts of energy, the "green" family of colors may be associated with object portions that absorb substantially low amounts of and the "yellow" family of colors may be associated with object portions that absorb amounts of energy in between the high and low amounts. Designating an amount of absorbed energy as "high", "medium" or "low" may be relative to the maximal and minimal amounts of energy absorbed by different portions of the object, relative to amounts of energy absorbed in some reference object, relative to predetermined values, or by any other method that allows grouping the amounts of absorbed energy. The graphical representation (e.g., 3D or 2D image) may be displayed to a user, e.g., on user interface 1640, in step 1840. A 3D isometric image or 2D cuts of a 3D image may be displayed, for example according to the user preferences and instructions. For example, a graphical image of the plate illustrated in FIG. 6 may be displayed to a user as a color map, where the salad having high water content and high energy absorption may appear to the user as a substantially red area, the fish having medium energy absorption may appear to the user as a substantially yellow figure of a fish, and the potatoes having the lowest energy absorption may appear as substantially green round figures. The user may point and select different areas or portion on the image and for each of the selected areas, the user may provide processing instructions (in step 1850). For example, the processing instructions may include: an energy level to be dissipated or absorbed in each area or portion of the object, desired final temperature for each area of the object, CU (cooking units) for each area of the object, final pressure of at least one area of the object, final humidity level for each area of the object and/or any other processing instructions that may assist in adjusting the energy application to at least one area or portion of the object.

In some embodiments, energy application (e.g., spatially selective energy application) to at least a portion of the object may be controlled by the processor (e.g., processor 2030, 1680 or controller 101) according to the acquired instructions and the spatial energy absorption value (step 1860). Different energy amounts may be applied to different areas or portions of the object. For example, X amount of energy may be applied to the potatoes, Y amount of energy may be applied to the fish, and Z amount of energy may be applied to the salad, wherein X>Y>Z. In some embodiments, Z may be equal to zero or substantially zero, indicating that little or no energy is to be applied to the salad.

Figure 12:
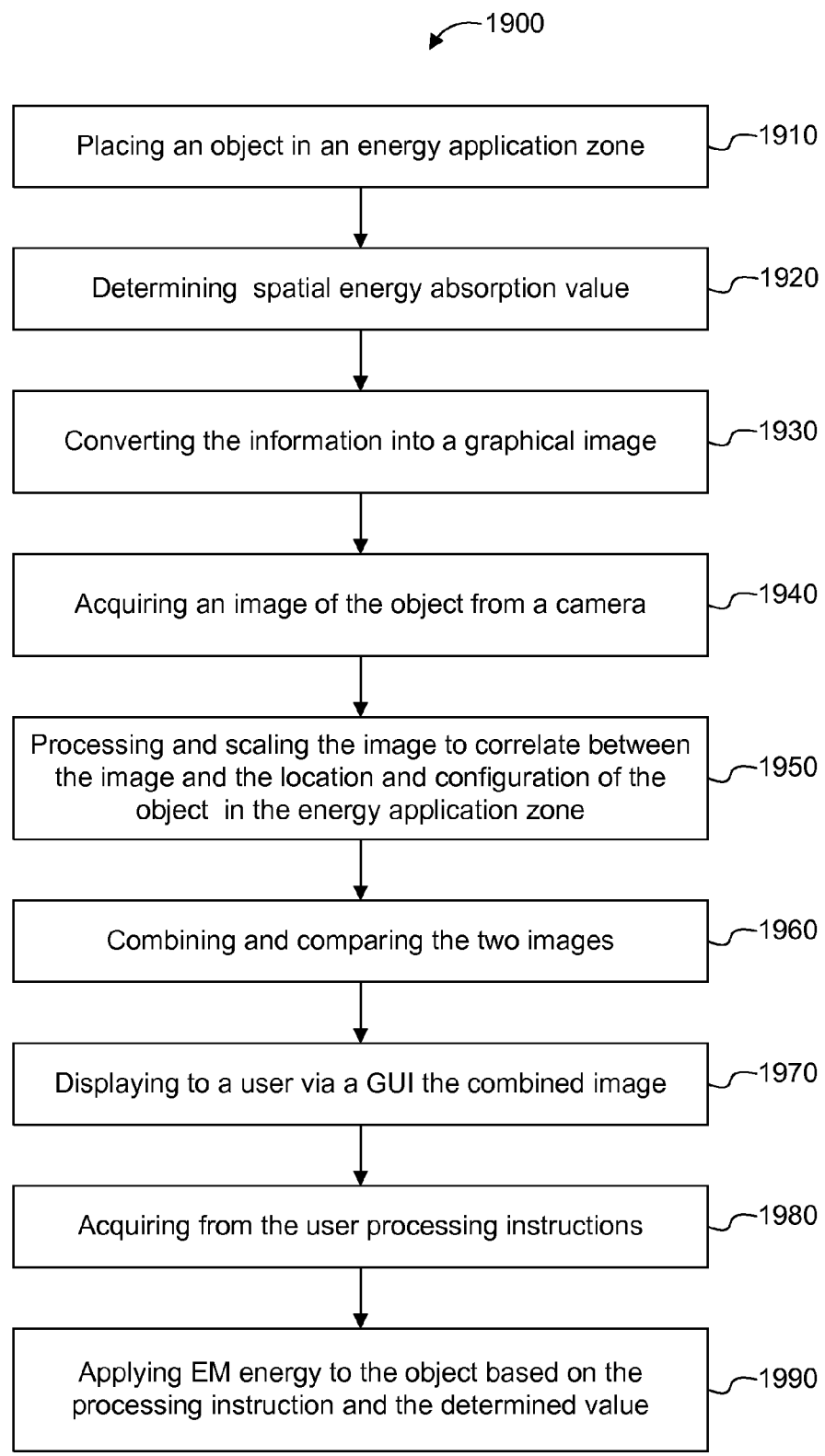
FIG. 12 is a flow chart of a method for controlling electromagnetic energy application to an object in accordance with some embodiments of the present invention.

FIG. 12 provides a flow chart of method 1900 for controlling energy application to an object in an energy application zone in accordance with some embodiments of the present invention. An object to be processed is placed in energy application zone (e.g., zone 9 or cavity 10) in step 1910. In step 1920, a spatial energy absorption value may be determined according to some embodiments of the invention. The determined spatial energy absorption value may be converted into a graphical representation (image), for example a 3D image (in step 1930). The graphical representation may present substantially the shape of the object. Optionally, different energy absorption values (e.g., a matrix or a vector of values wherein each value is associated with a different portion of the object) are marked and/or associated with different colors. An image of the object, optionally an optical image (generated based on visible light) or IR image (generated based on infrared radiation) may be acquired in step 1940, for example from camera 1610. The acquired image may be processed (e.g., to obtain a processed image) and optionally scaled to correlate between the image and the location of the object in the energy application zone, in step 1950. In some embodiments, the processing of the image may include zooming, filtering, e.g., digital filtering, image recognition processing or any other processing on images known in the art. In some embodiments, the image processing may be performed by the camera (e.g., by a processor included therein) and a processed image may be sent to processor 1680. The graphical representation of the spatial energy absorption value and the acquired image (or the processed image) may be combined (e.g., to obtain a combined image) and optionally compared in step 1960. The combining may allow correlating different energy absorption values to different areas or portions in the energy application zone. The combined image may be displayed to a user on a user interface, e.g., interface 1640, in step 1970. The user may select a display option such that only the acquired image (e.g., optical image) is shown. In some embodiments, the graphical representation of the spatial energy absorption value may be shown, or a combined image of the acquired image and the graphical representation of the spatial energy absorption value may be shown. The combined image may include overlapping images, wherein for example the acquired image is set as the background and the graphical representation of the spatial energy absorption values may be shown as semi transparent colors on the acquired image. The user may point and select different areas on the image (e.g., the combined image) and for each of the selected areas the user may provide processing instructions (in step 1980). For example, the processing instructions may include an energy level to be dissipated in each area or portion of the object, a desired final temperature for each area of the object, CU (cooking units) for each area of the object, final pressure of at least one area of the object, final humidity level for each area of the object and/or any other processing instructions that may assist in adjusting the energy application to at least one portion of the object. In some embodiments, EM energy application to the object may be controlled based on the acquired processing instructions and the determined spatial energy absorption value (step 1990).

Some embodiments of the invention may relate to a device and method for controlling energy application to an object based on on-line temperature measurements. In some embodiments, on-line temperature measurements include repetitive measurements or intermittent measurements that take place during the processing of the object. Thus, on-line measurements may refer to temperature measurement that occur continuously, randomly or periodically, for example, every 2, 3, 5 sec, or at particular events (e.g., after 5 kJ are dissipated in the object), by a predetermined schedule, etc. Referring back to FIG. 6, apparatus 1600 may include an IR camera configured to measure the temperature of the object. Additionally or alternatively, apparatus 1600 may include other temperature measurement devices, including, for example, thermocouples. The temperature measurement devices may be configured to measure the temperature (e.g., signals) from at least a portion of the object (e.g., by measuring, detecting or sensing), prior, during and/or after the energy application. The thermometers may be configured to acquire measurements from different portions of the object, and the processor (e.g., processor 1680) may further convert, calculate or determine from the acquired measurements a spatial temperature profile of the object. For example, the thermometer may include several thermocouples at different locations in the object. Alternatively or additionally, the object or a portion thereof may be scanned with an IR beam. The thermometer may be connected to a processor (e.g., processor 1680 or 2030 or controller 101), and results of the temperature measurements may be sent to the processor, optionally by wired or wireless transmission of signals indicative of the measured temperatures. In some embodiments, the processor may determine the location of each thermocouple in the energy application zone. For example, the locations may be pre-determined or may be determined from the optical image or may be provided by the user. The processor may be further configured to convert the temperature profile to an image (e.g., an image of the temperature profile) and to display the image to a user on a user interface (e.g., interface 1640). The image may be displayed as graphical symbols indicative of the temperature at a certain location(s) in the object, a graph representing the temperature profile along a certain line in the object, a 3D image of the temperature profile, or in any other way that conveys to the user the spatial temperature profile. A 3D image of the temperature profile (e.g., an IR image) may be presented to the user as a color map, wherein for example, low temperatures (e.g., −10° C. to 10° C.) may be represented by the "blue" family colors; medium-low temperatures (e.g., 11-30° C.) may be represented by the "green" family colors; medium-high temperatures (e.g., 31-70° C.) may be represented by the "yellow" family colors and high temperatures (e.g., 71-120° C.) may be represented by the "red" family colors. For example, a temperature profile of the plate of food as illustrated in image 1620, when taken out of a refrigerator and placed inside the energy application zone, prior to energy application, may appear to a user as a single substantially blue shape having a uniform temperature (e.g., 4° C.). In some embodiments, temperature profiles may be obtained during processing, and updated profiles may be displayed on screen 1630, for example, every 5 seconds, such that the user may track a temperature rise of the object, e.g., of different portions or items included in the object.

Optionally, in order to help the user to distinguish between different items, one or more additional image acquiring devices (e.g., camera 1610) may be included in the apparatus. An image acquired from the image acquiring device may be combined with an image of the temperature profile. The user may select to display the temperature profile image, the acquired image (e.g., optical image) or the combined image.

In some embodiments, the user interface may allow the user to choose between several presentation options, for example: the acquired image may be displayed at the background of the combined image, and the temperature profile(s) may be presented, for example as an IR image or graphical symbols (e.g., numbers) indicative of the temperature at certain locations (e.g., different portions of the object). The processor may be configured to associate the different portions of the object as displayed with the temperature profile. For example, at least one graphical symbol indicative of the temperature at a certain location may be displayed on a related area in the acquired image, or an indicator placed near the related area may be associated with the value presented elsewhere on the image. Yet another example may include a presentation of the temperature profile along a certain line in the object as a 1D graph. The X axis may be displayed on the image in an area associated with the area in which the temperature measurement was taken from. In yet another example, a 3D temperature profile may be displayed on the acquired image, wherein the different colors corresponding to different temperatures may appear as semi transparent colors on the acquired image. In order to correlate between the actual location at which the temperature was measured and the displayed image, the processor may process and optionally scale one or more of the displayed images, for instance, the temperature profile image, the acquired image and/or the combined image.

In some embodiments, the user may designate at least one portion of the object, or several portions of the object or at least one item within the object, and for each of the selected portions, the user may provide a target temperature or temperature range. In some embodiments, the user may further specify an amount of time (duration) for which the selected portion should be held at the target temperature. The processor (e.g., processor 1680 or 2030 or controller 101) may be further configured to control the energy application at a plurality of MSEs to the energy application zone, based on the user provided processing instructions, while monitoring the temperature profile of the object (e.g., the spatial temperature profile). The monitoring may include on-line temperature measurements, which may include, for example, continuous, intermittent, or periodic measurements. As the energy application progresses, the spatial temperature profile of the object may change. The changes may be continuously presented (e.g., displayed) to the user on the user interface. Additionally or alternatively the user may be alerted, for instance, audibly, if the temperature of one or more of the items or portions heat to a temperature outside an allowed range. In some embodiments, the user may select a display of the temperature profile among some given display options. The selection may be changed, for example, during energy application, according to the user's desire. For example, prior to the energy application, the user may select to display only the acquired image (e.g., optical image). However as energy application proceeds, the user may select a different display option, e.g. a spatial temperature profile image or the combined image, or the user may choose that the interface displays only temperatures at selected areas (when, for example, some areas are more heat sensitive than others).

In some embodiments, energy application to the object may be terminated when all portions of the object reach the desired temperature for the specified amount of time. Optionally, the processor may be further configured to adjust the energy application such that the different portions of the object reach the desired temperature at substantially the same time (e.g., simultaneously or nearly simultaneously). In some embodiments, the user may be prompted (e.g., through the user interface) when each portion of the object reaches its desired temperature and/or when all portions of the object reach their desired temperatures.

Figure 13:
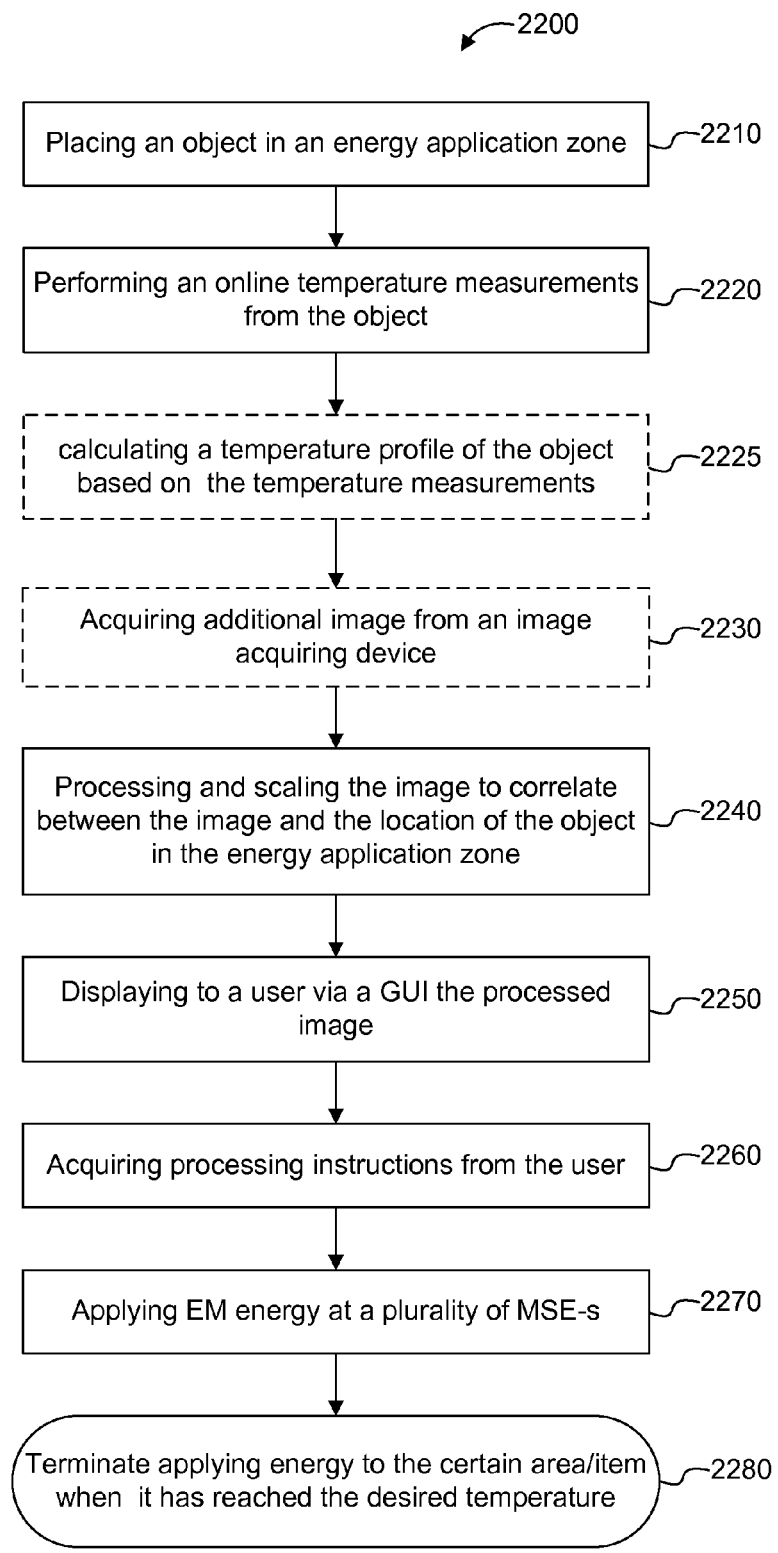
FIG. 13 is a flow chart of a method for controlling electromagnetic energy application to an object based on temperature measurements in accordance with some embodiments of the present invention.

Reference is now made to FIG. 13 and method 2200 for controlling energy application to an object according to some embodiments of the invention. Method 2200 may include on-line temperature measurement. In method 2200, an object to be processed may be placed in an energy application zone, in step 2210. Temperature measurement, for example IR measurements (e.g., IR scan), of the object may be performed in step 2220. Optionally, in some embodiments, a temperature profile image may be calculated or determined from the temperature measurements (e.g., from the IR scan) (step 2225). Optionally, an additional image (e.g., optical image) may be acquired from an image acquiring device (e.g., camera 1610), in step 2230, and may be combined with the temperature profile image. The temperature profile image or the combined image or the additional image may be processed and optionally scaled, in step 2240, in order to correlate between the image and the location of the object in the energy application zone and optionally the shape of the object. One or more of the processed images, including the temperature profile image, the combined image and the additional image may be displayed to a user on a user interface (e.g., interface 1640), in step 2250. The user may provide instructions to process at least a portion of the object or at least one area in the object or at least one item within the object, by selecting the at least one portion on the screen (e.g., screen 1630) in the user interface (e.g., interface 1640) in step 2260. The processing instructions may include a desired temperature that the selected portion should reach. Optionally, the processing instructions may include temperatures that the selected portion must not reach. The processing instructions may also include a duration of time for which the item is to be maintained at a specified temperature. EM energy may be applied at a plurality of MSEs in order to heat the selected portion to the desired temperature(s) in step 2270, and optionally to hold the at least one portion at the desired temperature for the desired amount of time (which may be referred to herein also as 'the holding time'). In some embodiments, temperature measurement of the object, for example IR measurements (e.g., IR scans), may be performed periodically during energy application, for example: every 0.5, 1, 2, 4, 10 min. In some embodiments, temperature measurement may be performed in response to a user request. In some embodiments, the processed image, (e.g., the temperature profile image or the combined image) may be continuously displayed. Update of the display may be as frequent as the temperature measurement, but is not necessarily so. In some embodiments, the display is updated only when a display update criterion is fulfilled. A display update criterion may include, for example, time that passed from last update, a specified temperature change, a specified volume change, a specified change in energy absorption, or others. For example, a display update criterion may correspond to when a temperature rises more than 2° C., when a volume shrinks by more than 5%, etc. The EM energy application may be terminated, in step 2280, after the entire object is completely processed, for example, after each portion is held for its holding time at its target temperature. In some embodiments, an IR sensor or another thermometer may confirm that each portion of the object has reached its desired temperature. In some embodiments, the EM energy application may be adjusted such that processing of the entire object is completed at substantially the same time.

Some aspects of the invention may relate to an apparatus and method for automatic identification of the object, optionally together with automatic control of the energy application to the energy application zone. An apparatus for automatic identification of an object placed in an energy application zone may comprise at least one radiating element for applying EM energy, at a plurality of MSEs, and at least one processor (e.g., processor 2030 or 1680 or controller 101) configured to determine a spatial absorption value indicative of energy absorption in at least a portion of the object (e.g., a matrix or a vector of values each indicative to energy absorption in a different portion of the object) according to some embodiments of the present invention. The processor may be further configured to convert the spatial absorption value to a visual representation of the object. The apparatus may further include at least one image acquiring device, for example an optical camera or IR camera, configured to acquire image of the object in the energy application zone. The image acquiring device may be positioned in a known location and orientation in the energy application zone and configured with a predetermined field of view. The processor may be further configured to process the image in order to correlate between the location of the object in the energy application zone and the image. Such processing may include scaling the position of the object in the image with that in the energy application zone. In some embodiments, the apparatus may include two or more image acquiring devices to provide a better correlation between the acquired images (from both devices) and the location and orientation of the object in the energy application zone.

In some embodiments, the processor may be further configured to determine the identity of the object based on the spatial value indicative of energy absorption in the object and the processed acquired image. In some embodiments, the processor may be further configured to determine the identity of the object based solely on the spatial value indicative of energy absorption in the object. In some embodiments, the processor may be further configured to determine the identity of the object based solely on the processed acquired image. The processor may discretize or divide the object into a plurality of regions (or sub-regions) each related to a certain location or portion of the object. An exemplary method for a discretization process is described above with respect to FIGS. 7A-7C and FIG. 8. In some embodiments, the object may be divided (e.g., discretized) to a plurality of areas (e.g., volumes) and a value indicative of energy absorption in each area may be calculated or determined to obtain a matrix of values, each indicative of energy absorption in a different area in the object. In some embodiments, a matrix of values corresponding to different known objects (e.g., different food objects) may be obtained and optionally recorded in a look up table. In some embodiments, the look up table may be stored in a memory, e.g., the processor's memory or another memory in the apparatus or in communication therewith (e.g., via the internet). A measured data (e.g., during run-time) related to each of the regions or sub-regions regarding the energy absorption information and/or value (e.g., matrix of values) may be compared with pre-stored data taken for example from the lookup table.

In some embodiments, images corresponding to different objects (e.g., a different food object) may be acquired and optionally recorded in a look up table. In some embodiments, images corresponding to different objects (e.g., a different food object) may be acquired when the object(s) are placed in the energy application zone. In some embodiments, the acquired image may be compared with pre-stored data taken, for example, from the lookup table. In some embodiments, the acquired image may be compared by image recognition methods known in the art. The pre-stored data may include: colors, shapes, textures, state of aggregation (liquid, solid or gas) and volume for regions acquired from the image acquiring device, and energy absorption values associated with different items to be processed. The data may include information regarding different: food types in various storing conditions (e.g., chilled, frozen, dried, at room temperature, etc.), chemicals, solutions, and catalyst, polymers, metals and ceramics, gases, organic materials (e.g. timber) and plasma. The apparatus may further include a memory configured to store the data.

In some embodiments, energy application zone 9 (e.g., cavity) may include positioning elements that may assist in positioning and/or orienting the object in the energy application zone. Positioning elements may include, for example, projections, lines, shapes, or text on a surface of the energy application zone that may help positioning the object in a predetermined manner. For example, a positioning element may include a drawing on a surface of the energy application zone that matches the shape of the object. Placing the object in a predetermined place may facilitate correlating between the location of the object in the energy application zone and in the acquired image.

In some exemplary embodiments, the energy application zone may include a cooking oven, and the processor may identify a group of food items to be cooked based on information gathered from an image acquired, for example, by an optical camera, and energy absorption values (e.g., values indicative of the energy absorption). For example, in the case of automatic cooking of three peeled potatoes and one turnip placed together in the energy application zone, the processor may perform the following stages in order to identify the object and to adjust the application of the target amount of EM energy to each of the items. In a first stage, sub-regions from the acquired image that form a substantially known shape, e.g., four round substantially white items, may be identified. Additional data regarding each of the items may be gathered from the optical image, for example: color shade, texture and/or geometrical shape may be compared to a known data stored in a look up table. The comparison may result in four different potential items: peeled potatoes, eggs, peeled turnips, or pre-baked buns. In the second stage, the energy absorption values determined for all the items are compared with known energy absorption values of peeled potatoes, an egg, peeled turnip or a pre-baked bun, stored in additional lookup table. In a third stage, the processor may identify the items as three potatoes and one turnip; based on the energy absorption values and the acquired image. The processor may further adjust the EM application to cook each of the three potatoes with a first amount of EM energy and the turnip with a second amount of EM energy, based on a third lookup table, storing amounts of energy associated with different food items.

The processor may further identify other parameters that relate to the state of the items, including, for example, the temperature, humidity, aging time and/or level of proofing (for yeast dough). These parameters may affect the energy absorption value. For example, the higher the humidity of the item, the higher the EM energy absorption value of that item. The stored data may include data related to the variation in energy absorption value of a particular item due to changes in the state of the item.

In some embodiments, the processor may be further configured to control, optionally automatically, the energy application to the energy application zone based on the identity of the object. Additional data stored, for example, in an additional look up table may be used to process at least a portion of the object or several items within the object. For example, the processor may control the energy application to the cooking oven such that 500 KJ may be absorbed in the three potatoes and 200 KJ may be absorbed in a turnip of given sizes.

In some embodiments, the apparatus may further include temperature measurement devices and/or water content measurement devices, and the lookup tables may include data regarding the temperature and/or water content levels of various items. The processor may further be configured to identify at least a portion of the object based on the temperature and/or humidity. The processor may further control the energy application to at least a portion of the object in order to achieve a desired temperature and/or a desired humidity level in at least a portion of the object or in several items within the object. For example, in a commercial fruit drying oven, the processor may identify ½ liter of fresh blueberries at a refrigerating temperature (4° C.) to be dried to 20% humidity level at 45° C.

Some embodiments of the invention may include other optional devices for measuring and/or monitoring other properties of the object to be processed, including, for example, a weighing device (e.g., a weight sensor), pH sensor, gas detecting sensor, etc. The measuring and/or monitoring devices may be used both for identifying the object and for controlling the energy application to the object.

In some embodiments, the apparatus may further include a user interface (e.g., interface 1640), and the processor (e.g., processor 1680 or 2030 or controller 101) may further be configured to prompt a user to provide additional processing instructions. The processor may prompt the user by displaying a request for processing instructions on the user interface screen (e.g., screen 1630). Additionally or alternatively, the processor may prompt the user by a voice or other audio messages, and the apparatus may further include an audio device configured to play audio messages. The user may provide additional processing instructions via the user interface, as disclosed, e.g., with respect to apparatus 1600 and method 1700. The processing instructions may include an energy level to be dissipated in each area of the object, a desired final temperature for each area of the object, a desired degree of doneness, CU (cooking units) for each area of the object, a final desired pressure of at least one area of the object, a final humidity level for each area of the object, and/or any other processing instructions that may assist in adjusting the energy application to at least one portion of the object.

In an exemplary embodiment, five items to be cooked may be placed in a cooking oven. The processor may identify the items to as five sirloin beef steaks. Following the identification, the processor may further prompt the user via the user interface and/or the audio device to select the degree of doneness for each sirloin beef steak. The user may point to each steak on the user interface screen and select, for example, from among several degrees of doneness. For example, the user may specify that two steaks are to be cooked until well done, two steaks should be medium, and one steak should be medium-rare. The processor may further control the energy application to the cooking oven based on the provided instructions and data stored in a lookup table. For example, the lookup table may indicate how much energy is to be absorbed in a 500 gm piece of sirloin steak in order to bring it to a given degree of doneness, and the processor may control energy application such that each steak absorbs the amount of energy indicated in or suggested by the lookup table. In some embodiments, RF energy application may be controlled such that all the steaks are done at about the same time.

Figure 14:
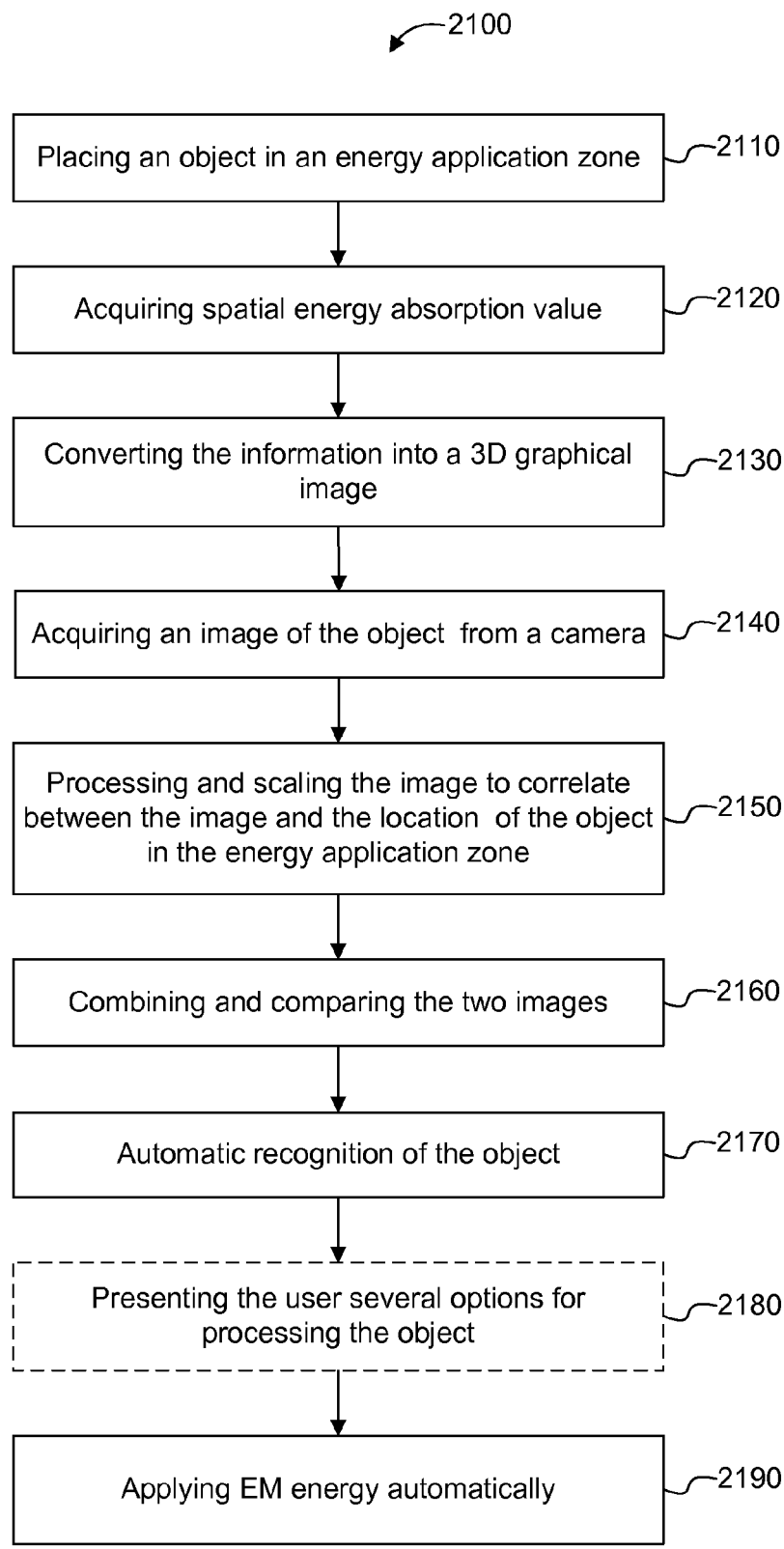
FIG. 14 is a flow chart of a method for automatically identifying and controlling energy application to at least a portion of an object placed in an energy application zone, in accordance with some embodiments of the present invention.

Reference is now made to FIG. 14 and method 2100 for automatically identifying and controlling energy application to at least a portion of an object placed in an energy application zone according to some embodiments of the invention. An object to be processed may be placed in energy application zone (e.g., zone 9) in step 2110. In step 2120, a spatial energy absorption value at a plurality of MSEs may be acquired according to some embodiments of the invention. The acquired spatial energy absorption value may be converted into a graphical representation, for example a 3D image (in step 2130). The graphical representation of the object may display substantially the shape of the object. Optionally, different energy absorption values (e.g., a matrix or a vector of values wherein each value is associated with a certain portion of the object) may be displayed differently, for instance, with different colors or markings. An image of the object, optionally an optical image or IR image may be acquired in step 2140, for example from camera 1610. The acquired image may be processed and optionally scaled to correlate between the location of the object in the acquired image and the location of the object in the energy application zone, in step 2150. The graphical representation of the spatial energy absorption value and the acquired image may be combined and optionally compared in step 2160. The combining may include associating different energy absorption values to different areas or portions of the object.

In some embodiments, automatic recognition (e.g., identification) of at least a portion or an item of the object may be performed, for example by comparing data stored in lookup tables with data gathered from the energy application zone, in step 2170. The data stored may include for example a list of: colors, shapes, textures, state of aggregation (liquid, solid or gas) and volume for the image, of at least a portion of known objects acquired by the image acquiring device, and energy absorption values associated with different known items. The data may include information regarding different food types, chemicals, solutions, catalysts, polymers, metals, ceramics, gases, organic materials (e.g. timber), and plasma. In some embodiments, automatic recognition (e.g., identification) of at least a portion or an item of the object may be performed by image recognition methods and optionally may be based solely on the acquired image.

In some embodiments, the processor may identify (based on the object identity) several options for processing the object and may present the different options to the user (e.g., via interface 1640) at step 2180. Optionally, different options for processing the object may be presented to a user by a pop-up menu on screen 1630. Optionally, processing instructions may be provided by the user via a user interface by selecting one of the presented options for processing the object. The user-provided processing instructions may be used when several optional processing instructions are stored in the processor for the identified object. For example: various degrees of doneness of cooked steak, different temperatures to warm a "ready to eat" dinner, different browning levels for a baked bread, different density (porosity levels) for sintered items or different PH levels in a solution.

In some embodiments, EM application to the energy application zone may be automatically controlled based on the identification of the object or a portion thereof, in step 2190. For example, data stored in a lookup table can be used as a basis for processing the object with EM energy. For example, the lookup table may include the required amount of energy to be absorbed in the object in order to process the object, including, for example, to cook a food item, to sinter an item, to cure a polymer, to cause chemical reaction, to generate plasma etc. Optionally, the energy application may be further based the processing instruction provided by the user.

In the foregoing Description of Exemplary Embodiments, various features are grouped together in a single embodiment for purposes of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate embodiment of the invention.

Moreover, it will be apparent to those skilled in the art from consideration of the specification and practice of the present disclosure that various modifications and variations can be made to the disclosed systems and methods without departing from the scope of the invention, as claimed. For example, one or more steps of a method and/or one or more components of an apparatus or a device may be omitted, changed, or substituted without departing from the scope of the invention. Thus, it is intended that the specification and examples be considered as exemplary only, with a true scope of the present disclosure being indicated by the following claims and their equivalents.

What is claimed is:

1. An apparatus for processing objects, placed in a cavity, with radiofrequency (RF) energy that is resonant in the cavity, the apparatus comprising:
 a display for displaying to a user an image of at least a first portion and a second portion of an object to be processed in the cavity;
 an input unit; and
 at least one processor configured to:
  receive information based on input provided to the input unit; and cause, based on the received information, application of RF energy resonant in the cavity to the object such that a first processing result is achieved in the first portion of the object and a second processing result is achieved in the second portion of the object;
  cause application of a plurality of electromagnetic field patterns to the object in the cavity;
  determine an amount of power dissipated in the object for each of the plurality of electromagnetic field patterns;
  determine one or more values indicative of energy absorption based on the amount of power dissipated in the object for each of the plurality of electromagnetic field patterns.

2. The apparatus according to claim 1, further comprising a source of RF energy.

3. The apparatus according to claim 1, wherein the at least one processor is configured to generate the image based on electromagnetic feedback providing the one or more values indicative of energy absorption in the object.

4. The apparatus according to claim 1, further including one or more infrared (IR) cameras configured to generate the image of the object to be processed.

5. The apparatus according to claim 1, wherein an image is generated of at least the first portion of the object and the second portion of the object to be processed.

6. The apparatus according to claim 1, wherein the at least one processor is configured to determine a weight associated with the one or more electromagnetic field patterns.

7. A method of processing an object in a cavity using radiofrequency (RF) energy resonant in the cavity, the method comprising:
 displaying to a user an image showing various portions of the object in the cavity; and receiving information relating to processing instructions from the user, wherein the information relating to processing instructions indicates that a first portion of the object shown in the image is to be processed differently from a second portion of the object; and applying RF energy to the cavity based on the information;

applying a plurality of electromagnetic field patterns to the object in the cavity;

determining an amount of power dissipated in the object for each of the plurality of electromagnetic field patterns; and determining the one or more values indicative of energy absorption based on the amount of power dissipated in the object for each of the plurality of electromagnetic field patterns.

8. The method according to claim 7, wherein the image comprises at least one of:

an optical image, generated based on visual light received from the cavity;

a graphical image, generated based on the one or more values indicative of energy absorption in the object; or a temperature profile, associating differing portions of the object in the cavity with different temperatures.

9. The method according to claim 8, wherein the one or more values indicative of energy absorption of the object provide a spatial absorption value.

10. The method according to claim 7, wherein the information relating to processing instructions includes at least one of:

a target amount of energy to be dissipated in at least a portion of the object, a target temperature profile of at least a portion of the object, a desired degree of doneness of at least a portion of the object, or a number of cooking units to be applied to at least a portion of the object.

11. The method according to claim 7, further comprising correlating between locations associated with the object in the image and locations associated with the object in the cavity.

* * * * *